(12) United States Patent
Watanabe et al.

(10) Patent No.: US 11,775,512 B2
(45) Date of Patent: Oct. 3, 2023

(54) DATA ANALYSIS APPARATUS, METHOD AND SYSTEM

(71) Applicant: KABUSHIKI KAISHA TOSHIBA, Tokyo (JP)

(72) Inventors: Wataru Watanabe, Tokyo (JP); Takayuki Itoh, Kanagawa (JP); Jumpei Ando, Kanagawa (JP); Keisuke Kawauchi, Kanagawa (JP); Toshiyuki Ono, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 213 days.

(21) Appl. No.: 17/446,607

(22) Filed: Aug. 31, 2021

(65) Prior Publication Data
US 2022/0188307 A1    Jun. 16, 2022

(30) Foreign Application Priority Data
Dec. 10, 2020  (JP) ................................ 2020-205231

(51) Int. Cl.
*G06F 16/242* (2019.01)
*G06F 16/22* (2019.01)
*G06F 16/26* (2019.01)
*G06F 18/24* (2023.01)
*G06F 18/21* (2023.01)

(52) U.S. Cl.
CPC ...... *G06F 16/2445* (2019.01); *G06F 16/2228* (2019.01); *G06F 16/26* (2019.01); *G06F 18/2193* (2023.01); *G06F 18/24* (2023.01)

(58) Field of Classification Search
CPC .. G06F 16/2445; G06F 16/2228; G06F 16/26; G06F 18/2193; G06F 18/24; G06F 18/23
See application file for complete search history.

(56) References Cited

U.S. PATENT DOCUMENTS

| | | | |
|---|---|---|---|
| 2018/0122062 A1* | 5/2018 | Takenaka | H04N 5/2621 |
| 2021/0134032 A1 | 5/2021 | Watanabe et al. | |
| 2022/0366103 A1* | 11/2022 | B R | G06Q 10/06 |

(Continued)

FOREIGN PATENT DOCUMENTS

| | | |
|---|---|---|
| JP | 5014500 B1 | 8/2012 |
| JP | 2021-71896 A | 5/2021 |

(Continued)

OTHER PUBLICATIONS

Keisuke Kawauchi e al., U.S. Appl. No. 17/899,784, filed Aug. 31, 2022.

*Primary Examiner* — Cam Y T Truong
(74) *Attorney, Agent, or Firm* — Finnegan, Henderson, Farabow, Garrett & Dunner, LLP

(57) ABSTRACT

According to one embodiment, a data analysis apparatus includes a processor. The processor acquires, for a plurality of products as analysis targets, manufacturing data including at least one manufacturing condition for each product. The processor calculates, based on a bias of state data representing a degree that the product is in a specific state in at least one item that can be taken concerning one manufacturing condition extracted from the manufacturing data, an index value representing a degree that a cause of the specific state of the product is the manufacturing condition.

18 Claims, 22 Drawing Sheets

(56) References Cited

U.S. PATENT DOCUMENTS

2023/0055892 A1    2/2023   Watanabe et al.
2023/0081798 A1    3/2023   Itoh et al.

FOREIGN PATENT DOCUMENTS

| JP | 2023-28393 A | 3/2023 |
| JP | 2023-43703 A | 3/2023 |
| WO | WO 2021/015093 A1 | 1/2021 |

* cited by examiner

| Product number | Device (data 1) | Material (data 2) | Measurement value (data 3) | Building (data 4) | Program (data 5) | ... |
|---|---|---|---|---|---|---|
| XXXX-00001 | A | 6 | 0.984976167 | A | A-1 | |
| XXXX-00002 | A | 1 | 0.428337445 | A | A-2 | |
| XXXX-00003 | B | 3 | 0.091870982 | B | A-3 | |
| XXXX-00004 | B | 2 | 0.384644033 | B | A-4 | |
| XXXX-00005 | A | 3 | 0.579640384 | C | A-5 | |
| XXXX-00006 | C | 3 | 0.297917015 | C | A-6 | |
| XXXX-00007 | C | 2 | 0.02231124 | A | A-7 | |
| XXXX-00008 | B | 3 | 0.77225139 | A | A-8 | |
| XXXX-00009 | B | 3 | 0.292869347 | B | A-1 | |
| XXXX-00010 | A | 5 | 0.137229218 | B | A-2 | |
| XXXX-00011 | A | 5 | 0.616594898 | C | A-3 | |
| XXXX-00012 | A | 2 | 0.018106058 | C | A-4 | |
| XXXX-00013 | C | 3 | 0.621334379 | A | A-5 | |
| XXXX-00014 | B | 3 | 0.247096173 | A | A-6 | |
| XXXX-00015 | A | 3 | 0.302249511 | B | A-7 | |
| XXXX-00016 | B | 3 | 0.356374484 | B | A-8 | |
| XXXX-00017 | B | 4 | 0.073878987 | C | A-17 | |

FIG. 2

| Product number | Device (data 1) | Material (data 2) | Measurement value (data 3) | Building (data 4) | Program (data 5) | ... | State data |
|---|---|---|---|---|---|---|---|
| XXXX-00001 | A | 6 | 0.984976167 | A | A-1 | ... | 0.685569195 |
| XXXX-00002 | A | 1 | 0.428337445 | A | A-2 | | 0.811569125 |
| XXXX-00003 | B | 3 | 0.091870982 | B | A-3 | | 0.53926036 |
| XXXX-00004 | B | 2 | 0.384644033 | B | A-4 | | 0.419434119 |
| XXXX-00005 | A | 3 | 0.579640384 | C | A-5 | | 0.980853061 |
| XXXX-00006 | C | 3 | 0.297917015 | C | A-6 | | 0.073292815 |
| XXXX-00007 | C | 2 | 0.02231124 | A | A-7 | | 1.000000000 |
| XXXX-00008 | B | 3 | 0.77225139 | A | A-8 | ... | 0.779452378 |
| XXXX-00009 | B | 3 | 0.292869347 | B | A-1 | | 0.578714341 |
| XXXX-00010 | A | 5 | 0.137229218 | B | A-2 | | 0.344663241 |
| XXXX-00011 | A | 5 | 0.616594898 | C | A-3 | | 0.644458571 |
| XXXX-00012 | A | 2 | 0.018106058 | C | A-4 | | 0.000000001 |
| XXXX-00013 | C | 3 | 0.621334379 | A | A-5 | | 0.132842057 |
| XXXX-00014 | B | 3 | 0.247096173 | A | A-6 | | 0.736797137 |
| XXXX-00015 | A | 3 | 0.302249511 | B | A-7 | | 0.000000000 |
| XXXX-00016 | B | 3 | 0.356374484 | B | A-8 | | 0.136445121 |
| XXXX-00017 | B | 4 | 0.073878987 | C | A-17 | | 0.999321151 |

FIG. 4

| Device | Total sum of individual state data | Number of products |
|---|---|---|
| A | 20.2 | 1000 |
| B | 19.4 | 1000 |
| C | 20.4 | 1000 |
F I G. 6
| Device | Total sum of individual state data | Number of products |
|---|---|---|
| A | 3.1 | 1000 |
| B | 49.8 | 1000 |
| C | 7.1 | 1000 |
F I G. 7
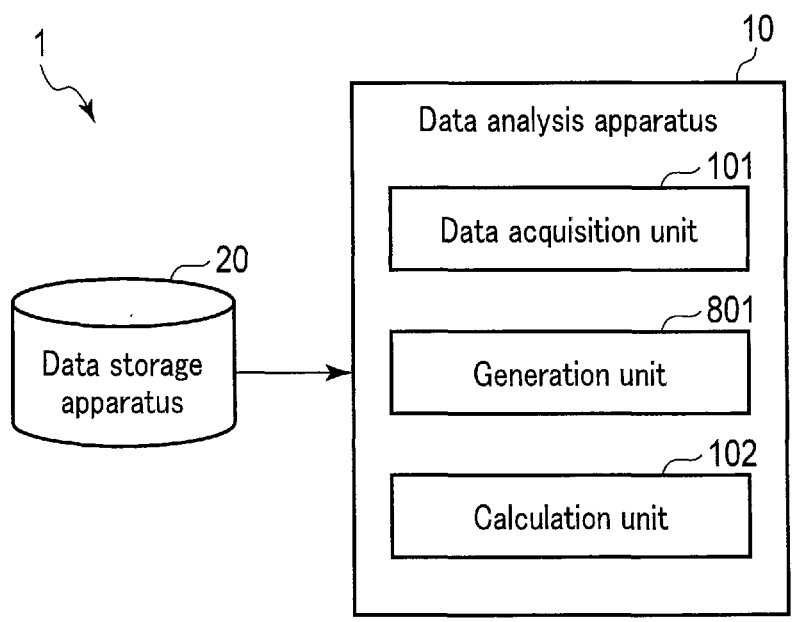
F I G. 8

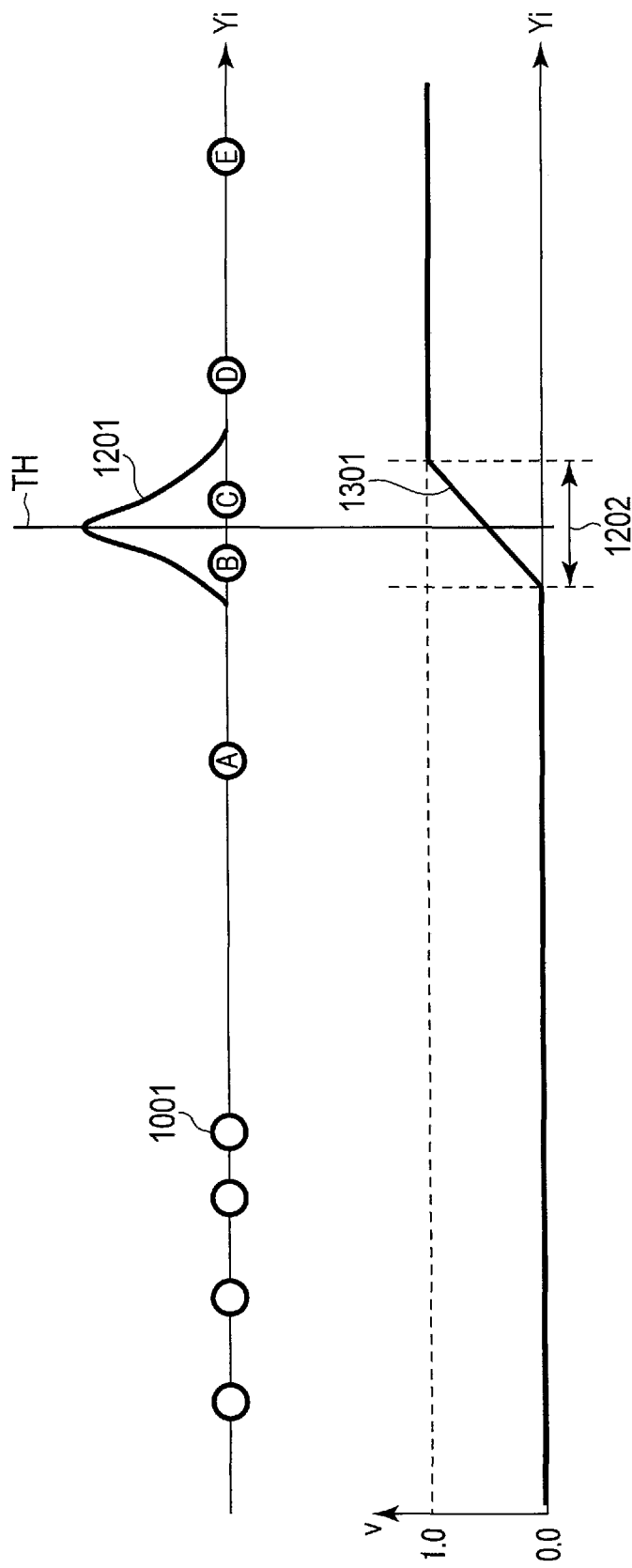
F I G. 13

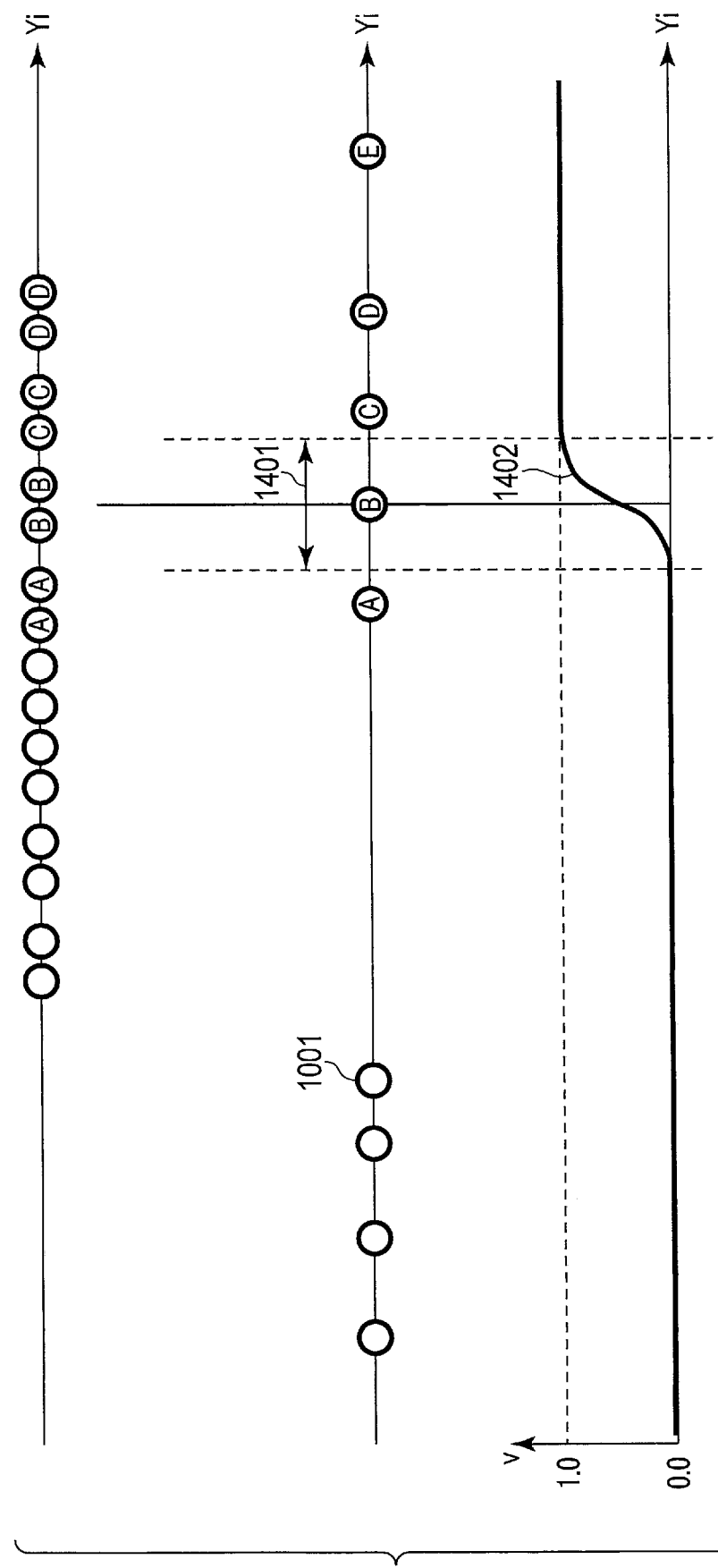
F I G. 14

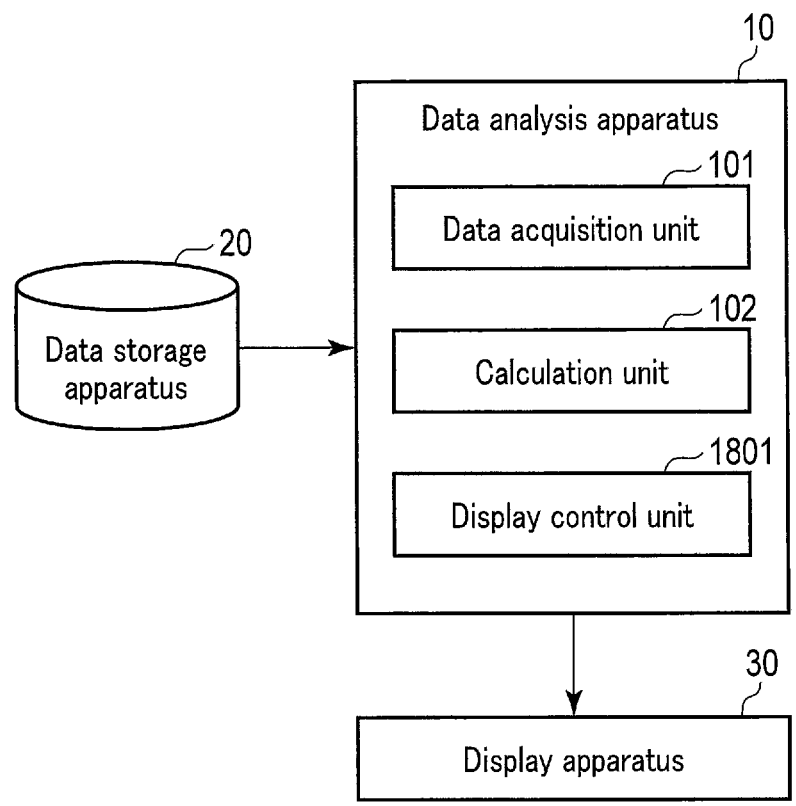
F I G. 18

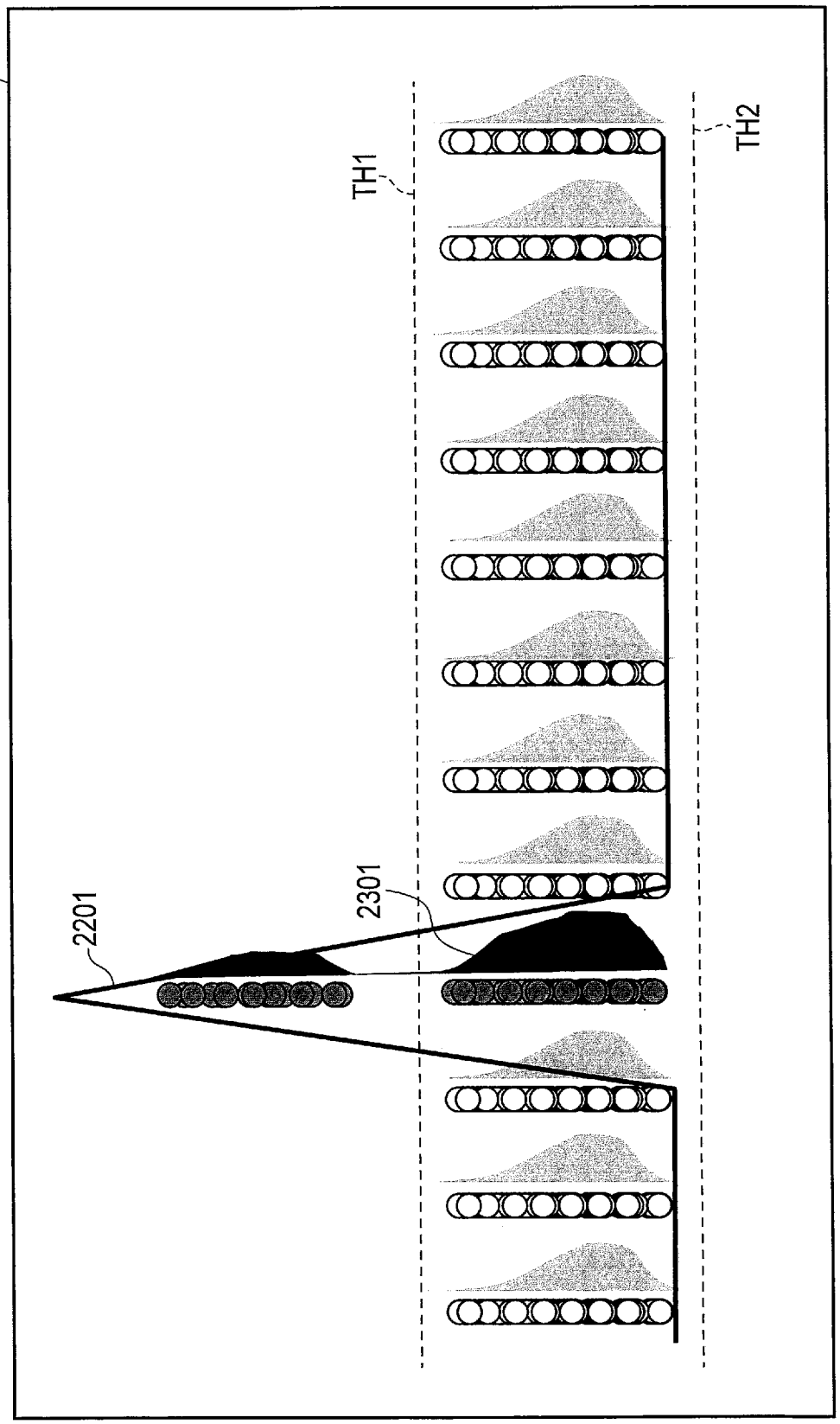
F I G. 23

DATA ANALYSIS APPARATUS, METHOD AND SYSTEM

CROSS-REFERENCE TO RELATED APPLICATIONS

This application is based upon and claims the benefit of priority from Japanese Patent Application No. 2020-205231, filed Dec. 10, 2020, the entire contents of which are incorporated herein by reference.

FIELD

Embodiments described herein relate generally to a data analysis apparatus, method and system.

BACKGROUND

In product manufacturing, if a product is in a specific state such as an anomaly in the product, it is important to early specify the cause of anomaly. In many manufacturers, various kinds of data are acquired in the process of manufacturing, and manufacturing steps are monitored, thereby making advantage of the data in state detection and cause specifying. If the cause of a specific state can be specified, the yield can be maintained and improved.

As a method of detecting such a state, there exists, for example, a method of counting the number of products determined to be anomalous and presenting the number as an index. However, this method corresponds to determining whether a product is anomalous or normal by a binary value "0" or "1". For this reason, if the probability of anomaly includes uncertainty between "0 and 1", the bias to a manufacturing condition assumed to be the cause of an anomaly may be estimated small or large. Hence, if the cause is investigated using this method, overlook or excessive detection undesirably occurs.

BRIEF DESCRIPTION OF THE DRAWINGS

FIG. 2 is a view showing an example of manufacturing data stored in a data storage apparatus;

FIG. 4 is a view showing an example in which manufacturing data and state data are stored in one database;

FIG. 6 is a view showing a first detailed example of an index value calculation method;

FIG. 7 is a view showing a second detailed example of the index value calculation method;

FIG. 8 is a block diagram showing a data analysis system according to the second embodiment;

FIG. 13 is a view showing another example of the third generation example of state data;

FIG. 14 is a view showing a fourth generation example of state data;

FIG. 18 is a block diagram showing a data analysis system according to the fourth embodiment;

FIG. 23 is a view showing another example of the second analysis result displayed in the second display region.

DETAILED DESCRIPTION

Figure 1:
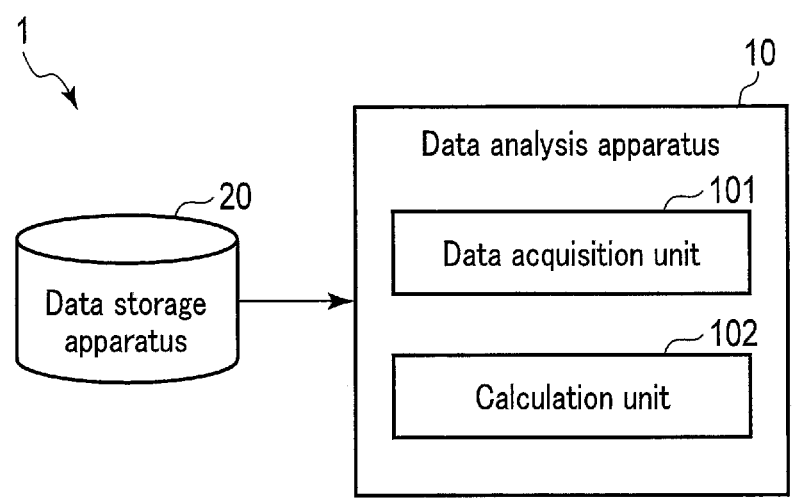
FIG. 1 is a block diagram showing a data analysis system according to the first embodiment.

In general, according to one embodiment, a data analysis apparatus includes a processor. The processor acquires, for a plurality of products as analysis targets, manufacturing data including at least one manufacturing condition for each product. The processor calculates, based on a bias of state data representing a degree that the product is in a specific state in at least one item that can be taken concerning one manufacturing condition extracted from the manufacturing data, an index value representing a degree that a cause of the specific state of the product is the manufacturing condition.

A data analysis apparatus, method and system according to the embodiments will now be described in detail with reference to the accompanying drawings. Note that the same reference numerals denote parts configured to perform similar operations in the following embodiments, and a repetitive description thereof will appropriately be omitted.

First Embodiment

A data analysis system according to the first embodiment will be described with reference to the block diagram of FIG. 1.

A data analysis system 1 includes a data analysis apparatus 10, and a data storage apparatus 20.

The data storage apparatus 20 stores, for each product, manufacturing data including a product number representing the identifier of the product and a manufacturing condition acquired in a manufacturing step. The data storage apparatus 20 also stores, for each product, state data representing the degree that the product is in a specific state. For example, if the specific state is an anomaly state, the state data is a value representing the probability that the product is anomalous.

The data analysis apparatus 10 includes a data acquisition unit 101 and a calculation unit 102.

The data acquisition unit 101 acquires, for a plurality of products as analysis targets, manufacturing data and state data including at least one manufacturing condition for each product from the data storage apparatus 20.

The calculation unit 102 receives the manufacturing data and the state data from the data acquisition unit 101, and calculates, based on the bias of the state data representing the degree that the product is in the specific state in one or more items that can be taken concerning one manufacturing condition extracted from the manufacturing data, an index value representing the degree that the cause of the specific state of the product is the manufacturing condition.

An example of manufacturing data stored in the data storage apparatus 20 will be described next with reference to FIG. 2.

FIG. 2 shows an example of a database configured to store manufacturing data. A product number 201 and manufacturing data 202 including one or more manufacturing conditions are associated with each other and stored as one entry in the database. Note that not the product number but any identifier capable of uniquely identifying a product can be used.

As the types of manufacturing conditions in the manufacturing data 202, for example, the name of a material used in a product, the name of a device used for processing or assembly, and the like can be used. More generally, pieces of information concerning "5M1E" are used. "5M1E" is a term formed by the initials of "Man", "Machine", "Material", "Method", "Measurement", and "Environment", which are known widely as six factors used to manage manufacturing steps.

For example, the data storage apparatus 20 stores, as manufacturing data, a processor name (Man), a device name, a manufacturing line name, the state of a device in processing (temperature, pressure, and the like) (Machine), the ID or name of a material or a component (Material), the type of a processing method or a processing program (Method), the name of a device that has performed measurement or a measurement point (Measurement), a building name, an atmospheric temperature, or a humidity (Environment), and the like. In addition, manufacturing data judged by the user as useful for analysis or visualization may be acquired.

In FIG. 2, for example, the product number 201 "XXXX-00001" and the manufacturing data 202 including manufacturing conditions such as device (data 1) "A", material (data 2) "6", measurement value (data 3) "0.984976167", building (data 4) "6", and program (data 5) "A-1" are associated with each other.

An example of state data stored in the data storage apparatus 20 will be described next with reference to FIG. 3.

Figure 3:
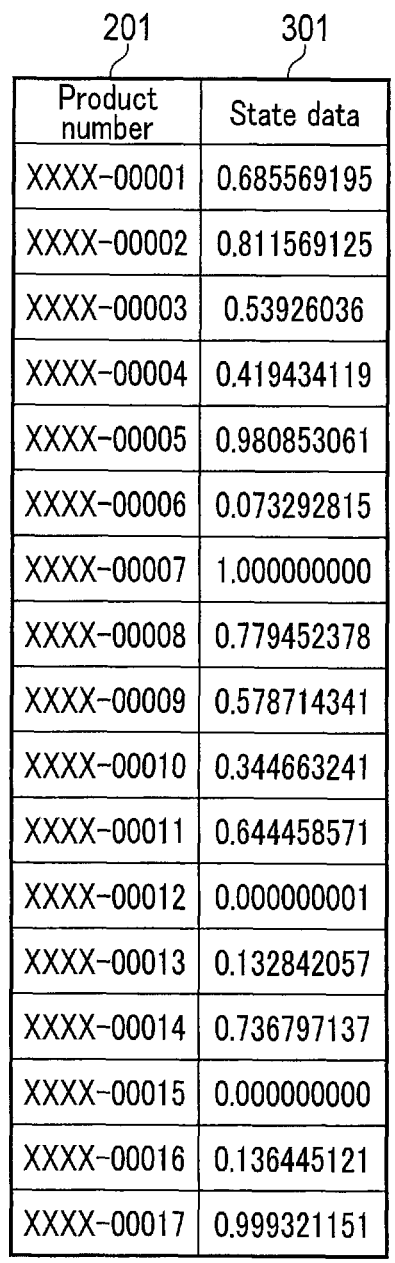
FIG. 3 is a view showing an example of state data stored in the data storage apparatus.

FIG. 3 shows an example of a database configured to store state data. The product number 201 and state data 301 are associated with each other and stored as one entry in the database. As a detailed example in FIG. 2, for example, the product number 201 "XXXX-00001" and the state data 301 "0.685569195" are associated.

In the embodiment, a description will be made taking, as an example, a case in which the state data of a product takes a real number of "0.0 to 1.0". This means, for example, the probability that a product is in a specific state, and a value close to "1.0" is taken if the possibility that a product is in a specific state is high. For example, if the state of a product is anomalous, the state data of the product represents the degree of anomaly, in other words, the probability than the product is anomalous. In the embodiment, "anomalous (or anomaly)" is assumed to be a state changed toward undesirable tendency with respect to a normal or prescribed state (for example, including a defective product or the like, which does not meet a shipment standard). As a case in which a product is in a specific state, a case in which a product is anomalous will be described below as an example. However, the specific state is not limited to this, and an arbitrary state such as a state generally assumed in manufacturing or product inspection or a case in which a specific condition is satisfied may be defined.

Note that the specific state is not limited to this and, for example, the degree that the state of a product is normal, or the degree of a state changed toward more preferable tendency with respect to a prescribed state may be defined. In this case, the cause of the more preferable state of the product can be estimated, and may be used to, for example, improve the yield or improve the product performance. The range of the state data of a product is not limited to a real number of "0.0 to 1.0" and, for example, the range of arbitrary real numbers may be used.

In addition, for example, if a plurality of product states can exist, a plurality of state data may exist. For example, in a site of manufacturing, specific modes are often defined as the types of specific states. More specifically, anomaly types (modes) are defined in many cases. State data is prepared for each mode, thereby estimating a cause for each mode.

Next, FIG. 4 shows an example in which manufacturing data and state data are stored in one database.

In the above-described example, the database of manufacturing data and the database of state data are separated. As shown in FIG. 4, manufacturing data and state data may be stored in one database in a combination.

The state data of a product may be set by an existing apparatus or method, or may be set manually. The state data may be set by a procedure of, for example, preparing a plurality of results of evaluating whether a product is in a specific state (anomaly) or not and averaging the plurality of results. For example, if the evaluation value of a state is assumed to vary depending on the evaluator, like the state of the outer appearance of a product, a value obtained by averaging a plurality of evaluation values may be used as state data.

Concerning a plurality of products as analysis targets, the data acquisition unit 101 acquires, from the data storage apparatus 20, manufacturing data including one or more manufacturing conditions and state data for each product. The number of products to be acquired, that is, the number of data of entries is assumed to be the number of data manufactured during a predetermined period as an analysis target. The predetermined period is, for example, an arbitrary period such as one hour or one day. Note that if the time or date of processing or inspecting each product is recorded in the database, the data of products during the predetermined period are acquired. Alternatively, if a number or a character string (a lot number or a lot ID) representing a predetermined period or a unit of a predetermined number of products is recorded in the database, the data of products of lot numbers corresponding to a designated range of numbers may be acquired. In addition, the user may designate an arbitrary condition and acquire the data of products.

Figure 5:
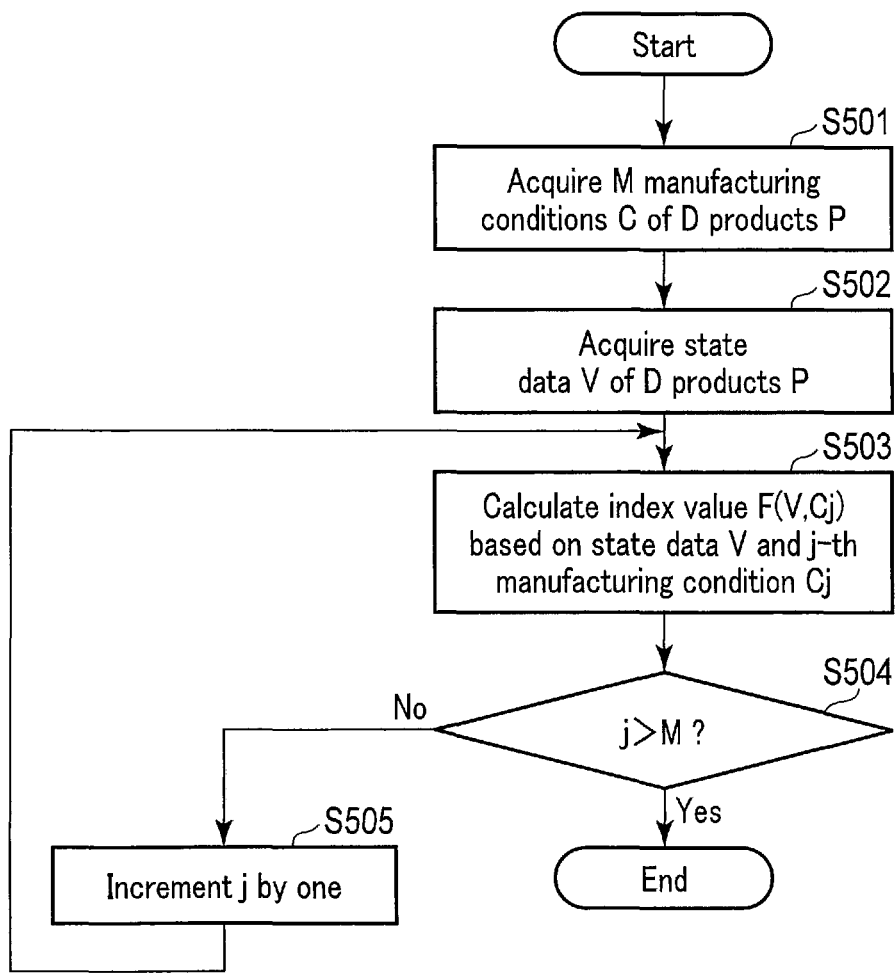
FIG. 5 is a flowchart showing data analysis processing of the data analysis apparatus according to the first embodiment.

Data analysis processing of the data analysis apparatus 10 according to the first embodiment will be described next with reference to the flowchart of FIG. 5.

An example in which analysis processing is performed for D (positive number: D>1) products P as analysis targets will be described with reference to FIG. 5. Note that the number D of products P as the analysis targets according to the embodiment is assumed to be, for example, several ten to several hundred, and can be a number that enables calculation of the bias of data in analysis processing. Also, as for the manufacturing data, a case in which M (positive number: M>0) manufacturing conditions $C_j$ (j=1, . . . , M) and one individual state data $v_d$ (d=1, . . . , D) exist for one product P is assumed. That is, the products P as the analysis targets are assumed to have D data, a manufacturing condition C includes D×M data, and state data V includes D individual state data $v_d$.

In step S501, the data acquisition unit 101 acquires M manufacturing conditions C for each of the D products P.

In step S502, the data acquisition unit 101 acquires the state data V concerning the D products P.

In step S503, the calculation unit 102 calculates an index value $F(V, C_j)$ based on the state data V and the jth manufacturing condition $C_j$ (j=1, . . . , M). The index value $F(V, C_j)$ represents the possibility that the manufacturing condition $C_j$ is the cause of the state data V. For example, if the state data V represents the probability that the product is anomalous, the index value $F(V, C_j)$ is an index representing that the manufacturing condition $C_j$ is the cause of the anomaly of the product.

In step S504, the calculation unit 102 determines whether or not all the M manufacturing conditions have been processed. In other words, it is determined whether "j>M". If all the M manufacturing conditions have been processed, the processing is ended. If not all the M manufacturing conditions have been processed, that is, if a manufacturing condition $C_j$ for which no index value is calculated exists, the process advances to step S505.

In step S505, j is incremented by one, and the process returns to step S503 to repeat similar processing. That is, the index value $F(V, C_j)$ is calculated for the next manufacturing condition $C_j$.

Detailed examples of the calculation method of the index value $F(V, C_j)$ in step S503 will be described next with reference to FIGS. 6 and 7.

The index value $F(V, C_j)$ according to the first embodiment is assumed to be a value that quantizes the degree that the value calculated from the state data V is biased to a specific manufacturing condition. That is, since it is assumed that the state data V represents the probability that the product has an anomaly, the bias of the total sum of probabilities of anomaly of the product under a specific manufacturing condition is used as the index value. In other words, this corresponds to counting the number of anomalous products under a specific manufacturing condition as a weighted sum based on the probability. Note that the index value is not limited to the bias of the total sum of probabilities, and any index value can be used if it represents the bias of state data.

Each of FIGS. 6 and 7 shows a table in which the total sum of the individual state data $v_d$ for each manufacturing apparatus and the number of products, which is the population for the calculated total sum, are associated with each other in a case in which the jth manufacturing condition $C_j$ represents "type of manufacturing apparatus". The number of types of manufacturing apparatuses corresponds to one or more items that can be taken concerning the manufacturing condition "type of manufacturing apparatus". It can be said that in the examples shown in FIGS. 6 and 7, three types of manufacturing apparatuses A, B, and C, that is, three items exist.

For example, in the example shown in FIG. 6, the total sum of individual state data $v_d$ concerning the item of the manufacturing apparatus "A" is "20.2", the total sum of individual state data $v_d$ concerning the item of the manufacturing apparatus "B" is "19.4", the total sum of individual state data $v_d$ concerning the item of the manufacturing apparatus "C" is "20.4", and the number of products is "1000". For example, the bias rate may be defined as "total sum of individual state data $v_d$ for each manufacturing apparatus/total sum of individual state data $v_d$ for all manufacturing apparatuses", and the maximum bias rate may be defined as the index value. In the case of FIG. 6, since the bias rates of the manufacturing apparatuses A to C are "20.2/60≈0.337", "19.4/60≈0.323", and "20.4/60≈0.340", respectively, the index value is "0.340".

On the other hand, FIG. 7 shows a case in which the total sum of the individual state data $v_d$ of the manufacturing apparatus "B" is much larger than the total sum of the individual state data $v_d$ of the manufacturing apparatus "A" and the total sum of the individual state data $v_d$ of the manufacturing apparatus "C", unlike FIG. 6. That is, FIG. 7 shows a case in which the ratio of manufacturing of products that may be anomalous is biased to a specific manufacturing apparatus. Since the bias rates of the manufacturing apparatuses A to C in the case of FIG. 7 are "3.1/60≈0.052", "49.8/60≈0.83", and "7.1/60≈0.118", respectively, the index value is "0.83".

Note that if the threshold for the index value is set to, for example, "0.7", the calculation unit 102 determines that the index value "0.83" is higher than the threshold "0.7", and it can be estimated that the cause of the anomaly in the products is the manufacturing condition $C_j$, that is, the type of the manufacturing apparatus, and the possibility that the cause is the manufacturing apparatus "B" is high.

If the number of products whose state data have values is small, for example, if only state data concerning products manufactured by a specific manufacturing apparatus in a plurality of types of manufacturing apparatuses has a value, and state data concerning products manufactured by other manufacturing apparatuses is "0.0", the maximum bias rate readily becomes high. Hence, for example, a value corrected such that the smaller the total sum of state data of all apparatuses is, the smaller the maximum bias rate becomes may be used as the index value.

Also, even if the number of items (number of conditions) under a given manufacturing condition is large, the maximum bias rate readily becomes high. That is, for example, if the manufacturing condition represents "type of manufacturing apparatus", the maximum bias rate readily becomes high if the number of types of manufacturing apparatuses, which is the number of items, is large. Hence, for example, a value corrected such that the larger the number of items (number of conditions) is, the smaller the maximum bias rate becomes may be used as the index value.

In addition, a bias like a bias rate used as an index value may be formulated in the framework of statistical test, thereby estimating a manufacturing condition as a candidate cause of an anomaly. In this embodiment, an example in which a G-test is used as a testing method for a variable of a nominal scale, like "manufacturing apparatus" is shown. However, the present invention is not limited to this, and another testing method such as a chi-squared test may be used.

An example in which the calculation unit 102 calculates the index value by the G-test will be described below. Here, a case in which manufacturing data represents the type of a manufacturing apparatus is assumed.

First, letting K be the number of types of manufacturing apparatuses (number of items) as the manufacturing condition, the number of products manufactured by each manufacturing apparatus is represented by $N_i$ {i=1, 2, . . . , K}, and the total sum of the individual state data $v_d$ for each manufacturing apparatus is represented by $O_i$ {i=1, 2, . . . , K}. In addition, the total number of products is represented by $N_{all}=N_1+N_2+ . . . +N_K$, and the total sum of the individual state data $v_d$ of all apparatuses is represented by $N_o=O_1+O_2+ . . . +O_K$.

Manufacturing data as an analysis target is regarded as a population, and null hypothesis that "the distribution of products (anomalous products) in a specific state for each condition is the same as the distribution randomly sampled from the population" is built. Next, the null hypothesis is tested, and a p-value is calculated. The smaller the p-value is, the higher the possibility that the hypothesis is rejected is. It cannot be said that the distribution is the same as random sampling. That is, it is suggested that the incidence of a product in a certain state is high under a specific condition. It is therefore possible to consider that if the p-value is small, the possibility that the manufacturing condition $C_j$ is the cause of state data, that is, the manufacturing condition $C_j$ is associated with the cause of the anomaly is high. Equation (1) is an equation used to calculate a G-value in the G-test.

$$G = 2\Sigma_{i=1}^{K} O_i \cdot \log_e(O_i/E_i) \quad (1)$$

where $E_i$ is the number of products expected in the null hypothesis, and is calculated by $$E_i = N_o \cdot P(i) = N_o \cdot \frac{N_i}{N_{all}} \quad (2)$$

where P(i) is the expected probability, which is the probability that a product determined to be anomalous in an item (ith manufacturing apparatus) occurs in a case in which the null hypothesis holds. If the true value of the probability value is unknown, it is approximated by a frequency distribution $N_i/N$ of the number of products as the analysis targets. Next, using a chi-squared distribution f(x, k), a p-value corresponding to the G-value is calculated by $$p = \int_G^\infty (x, k) dx \quad (3)$$

k=K−1, which represents the degree of freedom of the chi-squared distribution. In the chi-squared distribution, the larger a degree k of freedom is, the more hardly the p-value becomes small. If K is large, a bias readily occurs even in random sampling. The significance of the bias is evaluated in consideration of the number of items based on the above-described characteristic.

The p-value calculated in the above-described way is set to the index value $F(V, C_j)$. The smaller the index value $F(V, C_j)$ is, the higher the higher that possibility of the cause is.

Note that in the above-described G-test, a case in which manufacturing data is a categorical manufacturing condition, like a nominal scale, has been described. If the manufacturing condition $C_j$ is a continuous value, for example, the bias may be quantized as an index value using the correlation coefficient of the state data V and the manufacturing condition. $C_j$. That is, if products whose state data are close to "1.0" are biased to a high or low value of the manufacturing condition $C_j$, the absolute value of the correlation coefficient becomes large. Hence, the absolute value of the correlation coefficient may be used as the index value $F(V, C_j)$. The correlation coefficient (Pearson's correlation coefficient) is defined by $$r_{VC_j} = \frac{\sqrt{\frac{1}{N_{all}} \sum_{d=1}^{N_{all}} (c_{jd} - \overline{c_j})(v_d - \overline{v})}}{\sqrt{\frac{1}{N_{all}} \sum_{d=1}^{N_{all}} (c_{jd} - \overline{c_j})^2} \times \sqrt{\frac{1}{N_{all}} \sum_{d=1}^{N_{all}} (v_d - \overline{v})^2}} \quad (4)$$

where $N_{all}$ is the number of samples, which corresponds to the number of entries in this embodiment. $\overline{C_j}$ (a bar immediately above $C_j$) is the average of $C_j$, and $\overline{V}$ (a bar immediately above V) is the average of V. Note that an index other than the Pearson's correlation coefficient may be used. For example, if the distribution of state data V is not linear, a rank correlation coefficient such as a Spearman's correlation coefficient may be used.

A p-value using a test of a correlation coefficient may be used as the index value $F(V, C_j)$. For example, a test of a correlation coefficient (test of no correlation) may be used. In the test of the correlation coefficient, a p-value can be calculated using the fact that a statistic amount t given by equation (5) complies with a t-distribution of a freedom degree n−2.

$$t = \frac{|r_{VC_j}|\sqrt{N-2}}{\sqrt{1-r_{VC_j}^2}} \quad (5)$$

Concerning a case in which the manufacturing condition $C_j$ is categorical and a case in which it is a continuous value, an example in which the bias of a value calculated from the state data V of a product to a specific manufacturing condition is quantized as an index value has been described above. However, another bias calculation method or testing method may be used.

According to the above-described first embodiment, considering that the value calculated from the state data V of a product is a continuous value, the bias to the specific manufacturing condition $C_j$ can be calculated as the index value $F(V, C_3)$. This makes it possible to calculate the bias to a specific manufacturing condition in consideration of uncertainty concerning whether each product is anomalous or not and reduce overlook or excessive detection.

Second Embodiment

A data analysis system according to the second embodiment will be described with reference to the block diagram of FIG. 8. A data analysis apparatus 10 according to the second embodiment includes a data acquisition unit 101, a calculation unit 102, and a generation unit 801.

The generation unit 801 receives individual data used to determine the state of each product from a data storage apparatus 20, and generates state data of each product from the individual data. As the individual data, for example, a measurement value concerning an inspection item such as the size or weight of a product can be used. Depending on the type of the product, a result of measuring an electrical characteristic or physical characteristic may be used as the individual data. For example, the size and weight of a product are measured on a product basis by an external measurement apparatus and stored as individual data in the data storage apparatus 20. Note that the present invention is not limited to this, and any individual data can be used if it is data capable of grasping and determining the state of a product.

Data analysis processing of the data analysis apparatus 10 according to the second embodiment will be described next with reference to the flowchart of FIG. 9.

Figure 9:
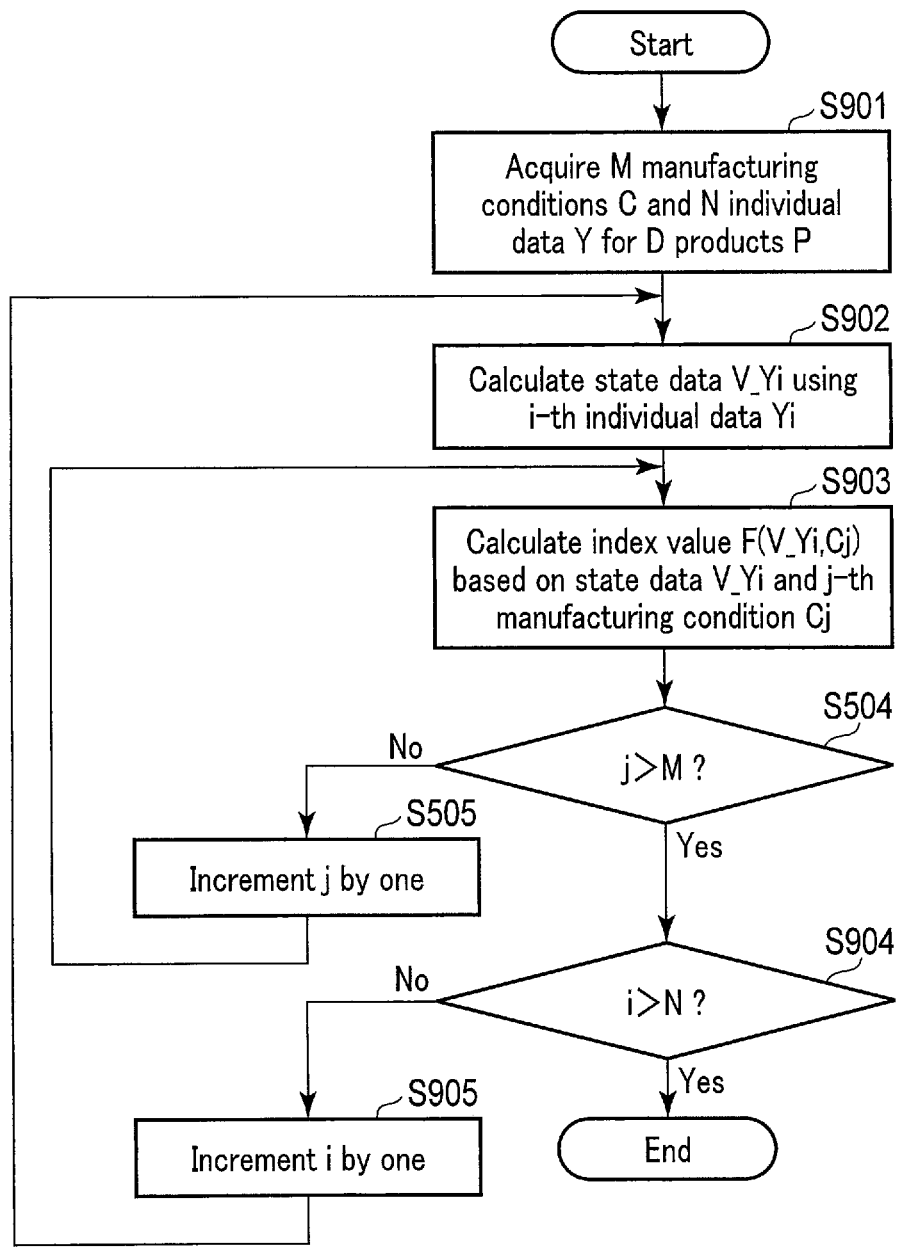
FIG. 9 is a flowchart showing data analysis processing of a data analysis apparatus according to the second embodiment.

FIG. 9 assumes a case in which N individual data Y exist for each of D products P as analysis targets. That is, the individual data Y includes D×N data.

In step S901, the data acquisition unit 101 acquires M manufacturing conditions C and N (positive number: N>0) individual data Y for each of the D products P.

In step S902, the generation unit 801 generates state data $V\_Y_i$ using ith individual data $Y_i$ (i=1, . . . , N). For the state data $V\_Y_i$, a standard similar to that in the first embodiment is assumed. That is, since the state data $V\_Y_i$ is generated for each individual data $Y_i$, N state data $V\_Y_i$ are generated.

In step S903, the calculation unit 102 calculates an index value $F(V\_Y_i, C_j)$ based on the state data $V\_Y_i$ and a jth manufacturing condition $C_j$. The index value calculation method is the same as in the first embodiment, and a description thereof will be omitted here.

Next, by the processes of steps S504 and S505, the index value $F(V\_Y_i, C_j)$ for each of the M manufacturing conditions $C_j$ is calculated for the state data $V\_Y_i$ concerning the ith individual data $Y_i$. That is, concerning the state data $V\_Y_i$ based on the ith individual data $Y_i$, M index values $F(V\_Y_i, C_j)$ are calculated.

In step S904, for example, the calculation unit 102 determines whether or not all the N individual data have been processed. That is, whether or not i>N is satisfied. if all the N individual data have been processed, the processing is ended. If unprocessed individual data $Y_i$ remains, the process advances to step S905.

In step S905, i is incremented by one, and the process returns to step S902 to process the next individual data $Y_i$ and repeat similar processing.

A first generation example of state data in step S902 will be described next with reference to FIG. 10.

Figure 10:
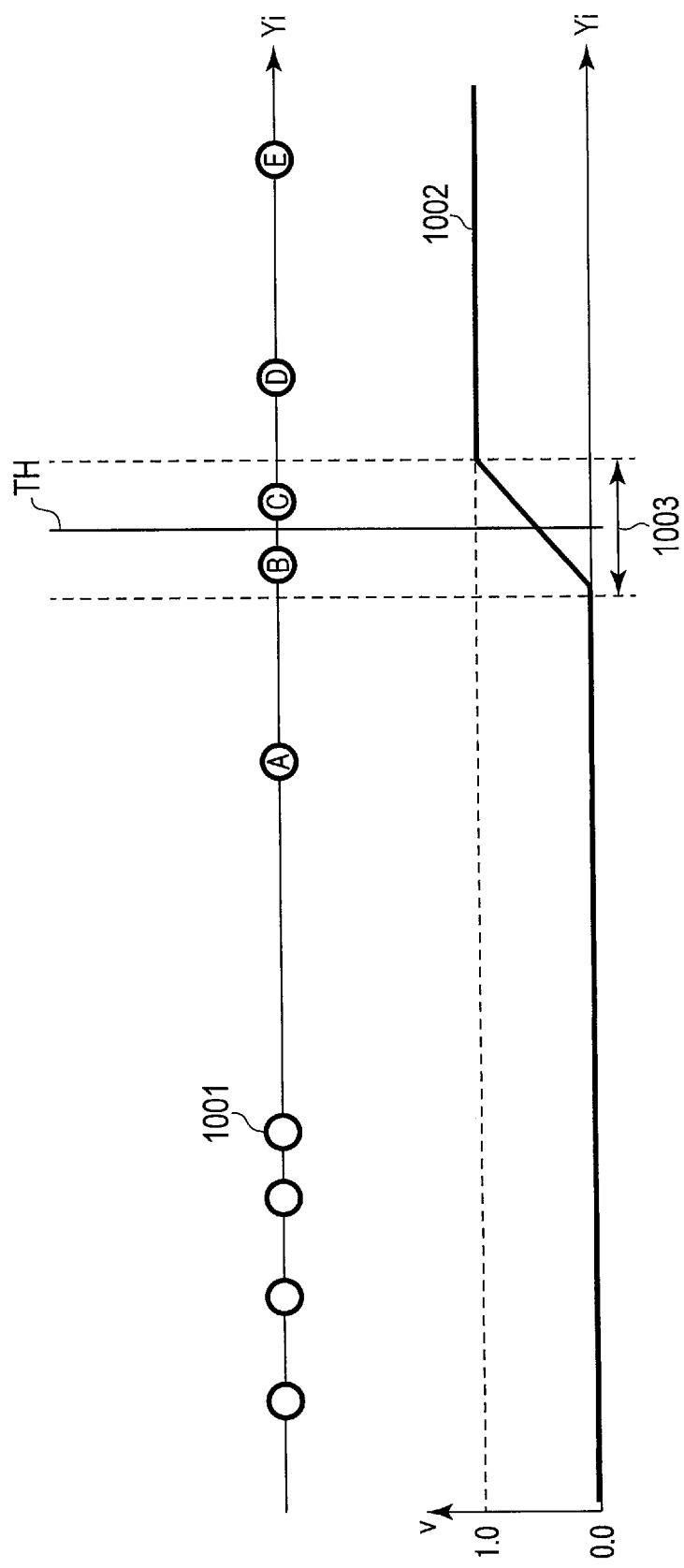
FIG. 10 is a view showing a first generation example of state data.

The horizontal axis of the upper and lower sides of FIG. 10 represents the value of the individual data $Y_i$ (for example, the size of a product), and the vertical axis represents the value of individual state data $v_{d\_}Y_i$ (simply expressed as v in FIG. 10, and the same will apply hereinafter). In addition, a graph 1002 of the individual state data $v_{d\_}Y_i$ based on the value of the individual data $Y_i$ is shown. In the example shown in FIG. 10, the individual state data $v_{d\_}Y_i$ indicates a normal state by "0.0" and indicates an anomaly state by "1.0".

Individual data $Y_i$ 1001 of each product is plotted. Here, the state of the individual data $Y_i$ is discriminated by a threshold TH used to determine that a product is in a specific state.

As shown in FIG. 10, the generation unit 801 provides ranges before and after the threshold TH as a margin range 1003, and decides, in the margin range 1003, the value of the individual state data $v_{d\_}Y_i$ to "0.0 to 1.0" by linear interpolation. For example, the minimum value of $Y_i$ in the margin range 1003 is individual state data "$v_{d\_}Y_i$=0.0", and the maximum value of $Y_i$ in the margin range 1003 is individual state data "$v_{d\_}Y_i$=1.0". For another $Y_i$ in the margin range 1003, the value of the individual state data $v_{d\_}Y_i$ proportional to the value of $Y_i$ is decided.

That is, if it is determined, by a general method using the threshold TH, whether a product is normal or anomalous, in the example of the upper side of FIG. 10, determination is done by binarization such that products "A" and "B" are normal, and products "C", "D", and "E" are anomalous. On the other hand, in the embodiment, since the value of the individual state data $v_{d\_}Y_i$ is given by "0.0 to 1.0", flexibility can be imparted in anomaly detection or cause estimation later such that the product "B" includes the possibility of normality as compared to the product "A", and the product "C" includes the possibility of anomaly as compared to the product "D".

Note that as the decision method of the threshold TH, for example, a standard value or a management reference value used in production management is used as the threshold TH. The standard value is determined for a product to be shipped. Since a product that exceeds the standard value cannot be shipped, this value may be used as the threshold TH. The management reference value is a value provided to ensure the standard value in production management. Not the standard value or management reference value itself but a value (for example, 80% or 90% of the management reference value) associated with the standard value or management reference value may be used as the threshold TH.

The threshold TH may be calculated from the individual data $Y_i$. For example, the average and standard deviation of the individual data $Y_i$ are calculated for the population of products, and if the value of the individual data $Y_i$ falls outside a predetermined range of a, it may be determined that a product is in a specific state (for example, anomaly). The population of products is designated by an arbitrary method based on, for example, a product group manufactured during a specific period or a group of a specific number of products. The method is not limited to the decision method based on the range of a, and if the value of the individual data $Y_i$ is a value outside the range of ±3σ or ±4σ, it may be determined that a product is in a specific state. The range of a may be changed between positive and negative values.

In addition, since manufacturing data often includes an outlier, a robust estimation method may be used to a median and an outlier by a quartile in place of the least square method. For example, the median of measurement values may be an average μ of a normal distribution. Also, standard deviation σ=0.7413×IQR (quartile range=distance between first quartile and third quartile) may be used. The threshold TH may be decided based on not the value σ but a predetermined percentile point. When these values are used, a product having a large variation with respect to a specific product group can be determined as anomaly.

The group of products used to calculate the threshold TH and the group of products as the targets of determination may be different. For example, the threshold TH may be decided from a group of past products, and anomaly may be determined for a group of current products. Alternatively, the threshold TH may be decided from a group of products in another environment (another production base or the like).

Note that in FIG. 10, it is assumed that if the value of the individual data $Y_i$ is larger than the threshold TH, the possibility that the possibility is anomalous is high. Reversely, similar processing can be performed to determine that the product is anomalous if the individual data $Y_i$ is smaller than the threshold. In this case, the graph 1002 is reversed with respect to the threshold TH.

A second generation example of state data will be described next with reference to FIG. 11.

Figure 11:
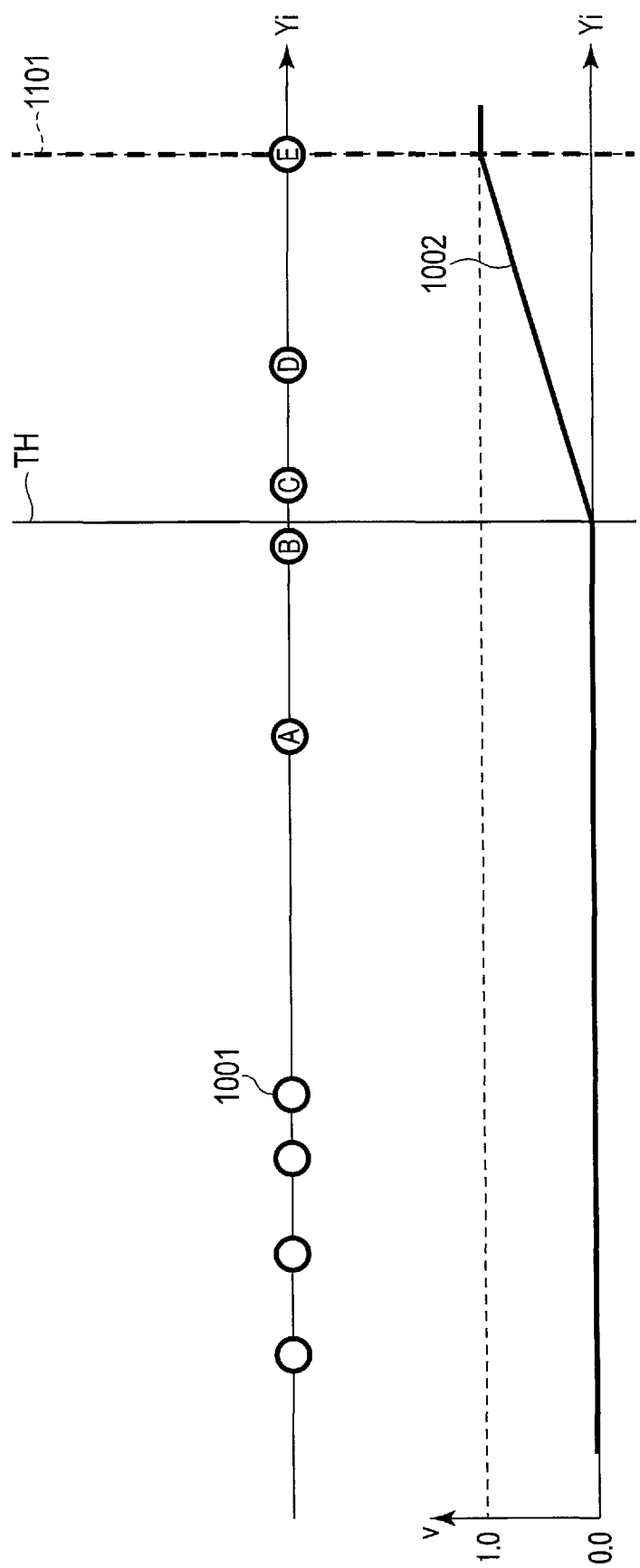
FIG. 11 is a view showing a second generation example of state data.

Although FIG. 11 is similar to FIG. 10, instead of setting the margin range 1003, the individual state data "$v_{d\_}Y_i$=0.0" may be set if $Y_i$ equals the threshold TH, and the individual state data "$v_{d\_}Y_i$=1.0" may be set for a maximum value 1101 of the values of the individual data $Y_i$. Between the threshold TH and the maximum value 1101, the value of the individual state data $v_{d\_}Y_i$ is set by linear interpolation. In the example shown in FIG. 11, since the value of the individual data $Y_i$ of the product "B" is maximum, the value of the individual data $Y_i$ of the product "B" is set as the maximum value 1101, and the value of the individual state data $v_{d\_}Y_i$ is linearly decided between the threshold TH and the maximum value 1101. It is therefore possible to determine the degree of anomaly high as the distance (difference) from the threshold TH becomes large.

A third generation example of state data will be described next with reference to FIGS. 12 and 13.

In the third generation example, a case in which a measurement error derived from a measurement means or a measurement condition exists in the value of individual data is assumed. For example, if measurement is performed a plurality of times by a measurement means, the measurement results have variations (measurement variations). This is often derived from the repeat accuracy of the measurement function of an apparatus or the environment (temperature, humidity, vibration, and interference by another factor) at the time of measurement. As described above, if an anomalous product is to be determined based on the threshold, uncertainty derived from the measurement error is included.

The generation unit 801 according to the second embodiment calculates the individual state data $v_{d\_}Y_i$ in consideration of a variation in a measurement result as described above.

Figure 12:
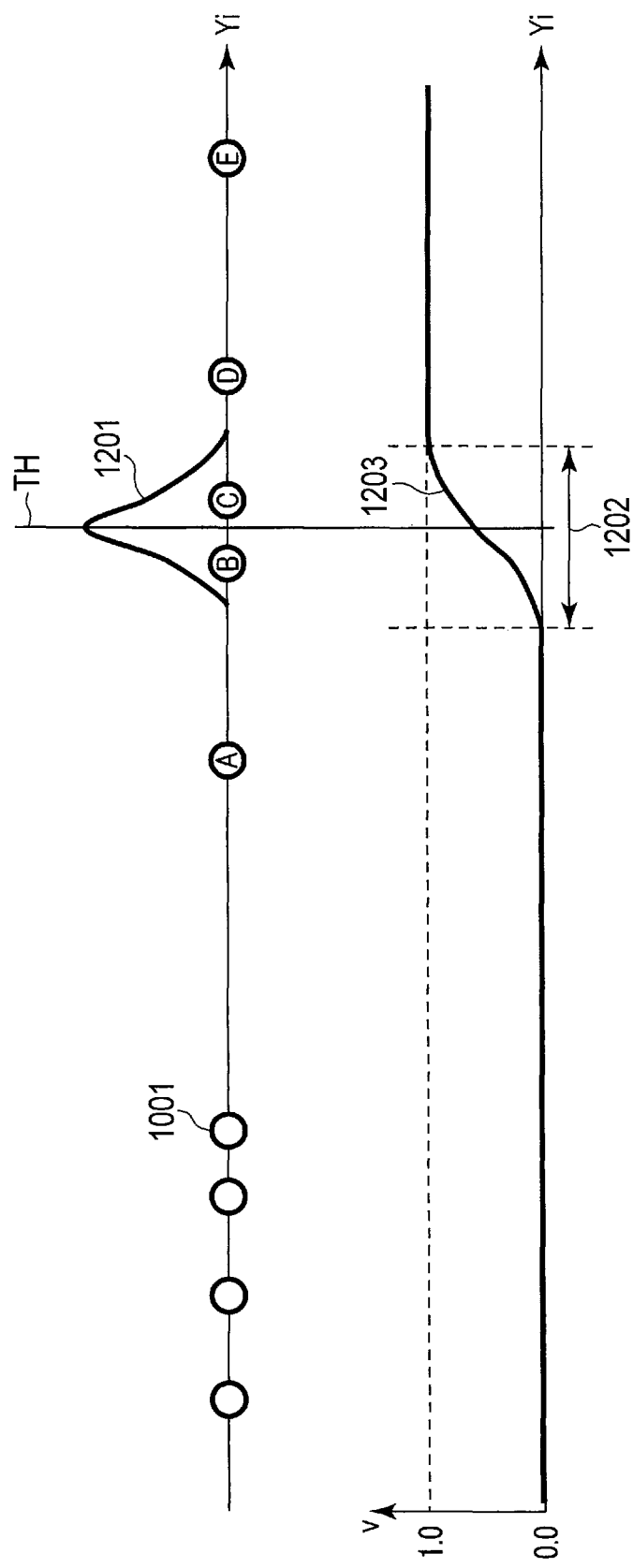
FIG. 12 is a view showing a third generation example of state data.

FIG. 12 is similar to FIG. 10, the individual data $Y_i$ of the product "A" and the product "B" are less than the threshold, and the individual data $Y_i$ of the product "C" and the product "D" are equal to or more than the threshold In the example shown in FIG. 12, concerning the value of the individual data $Y_i$ of the product "B", the probability that the true value of the individual data $Y_i$ is equal to or larger than the threshold is higher than the probability of the individual data $Y_i$ of the product "A". Conversely, concerning the individual data $Y_i$ of the product "C", the probability that the true value of the individual data $Y_i$ is less than the threshold is higher than the probability of the individual data $Y_i$ of the product "D". On the other hand, as for the product "A", since the value is sufficiently far apart from a range 1201 of measurement variations, the possibility that the value of the individual data $Y_i$ exceeds the threshold TH due to the measurement error is low. Similarly, for the product "D" as well, the possibility that the value is less than the threshold TH is considered as sufficiently low.

Hence, the generation unit 801 defines, for example, the range 1201 of measurement variations by the standard deviation a, and sets the individual state data $v_{d\_}Y_i$ of a product based on uncertainty (probability) derived from a measurement error. For example, when a function 1203 representing the accumulation probability of a normal distribution is used, the value of the individual state data $v_{d\_}Y_i$ can be decided in a range 1202 corresponding to the individual data $Y_i$ existing in the range 1201 of measurement variations. Note that as for the function 1203, a function such as a sigmoid function or a logistic function may be used. In this case, a measurement variation a or a constant multiple thereof may be set to the scale parameter of the function.

Note that the range of measurement variations need not always be defined by a normal distribution, and may be defined by another method such as a Poisson distribution or a t-distribution.

Next, FIG. 13 is similar to FIG. 12, and shows an example in which the value of the individual state data $v_{d\_}Y_i$ is decided in the range 1202 by applying a function 1301 of linear interpolation. Note that not linear interpolation as shown in FIG. 13 but an asymmetrical shape, other than a point-symmetrical shape, with respect to a certain point of the threshold TH (for example, the intersection between the threshold TH and the function 1301) as the center may be used.

As described above, considering uncertainty derived from the measurement error included in the individual data $Y_i$, the individual state data $v_{d\_}Y_i$ of a product can be set, and cause estimation can be performed based on the bias of the individual state data $v_{d\_}Y_i$. It is therefore possible to reduce overlook or excessive detection caused by uncertainty derived from the measurement error or the like included in the individual data $Y_i$.

A fourth generation example of state data will be described next with reference to FIGS. 14 and 15.

In the fourth generation example, a case in which the value of the individual data $Y_i$ includes a quantization error concerning quantization of data is assumed. In general, when a numeral value is recorded as data, the data is quantized. Also, due to the influence of a restriction on the data capacity or the number of significant figures, the data is often rounded to a predetermined number of fractional digits and then recorded. For example, if measurement performance is up to the third decimal place, the quantization width is 0.1, and data is quantized by rounding, data having a value of 0.1 may have been a value from 0.050 to 0.149. Hence, the recorded data has uncertainty within the range of the quantization width.

For this reason, the generation unit 801 may set the individual state data $v_{d\_}Y_i$ of a product based on, for example, the uncertainty (probability) derived from the quantization error.

The upper of FIG. 14 shows the distribution of the individual data $Y_i$ of each product before quantization. The horizontal axis represents the value of the individual data $Y_i$. The middle of FIG. 14 shows the distribution of the individual data $Y_i$ of each product after quantization. It is assumed here that the quantization is performed by a certain quantization width Δ. In the view after quantization shown in the middle of FIG. 14, the individual data $Y_i$ of the product "B" has a value less than the threshold TH. However, since the data has uncertainty within the range of quantization width, the individual data $Y_i$ of the product "B" may have a value equal to or more than the threshold before the quantization.

The lower side of FIG. 14 is similar to FIG. 12, and shows a view of the individual state data $v_{d\_}Y_i$ of a product considering a quantization error. In a range 1401 of quantization width, the generation unit 801 decides the value of the individual state data $v_{d\_}Y_i$ by applying a function 1402 such as a sigmoid function or a logistic function in the range of the state data $V\_Y_i$ of "0.0 to 1.0". In this case, the quantization width Δ or a constant multiple thereof may be set to the scale parameter of the function. More specifically, in FIG. 14, a value of "0.0 to 1.0" is set in accordance with the distance to the threshold for a product having the individual data $Y_i$ within the range of ±Δ/2 from the threshold.

Figure 15:
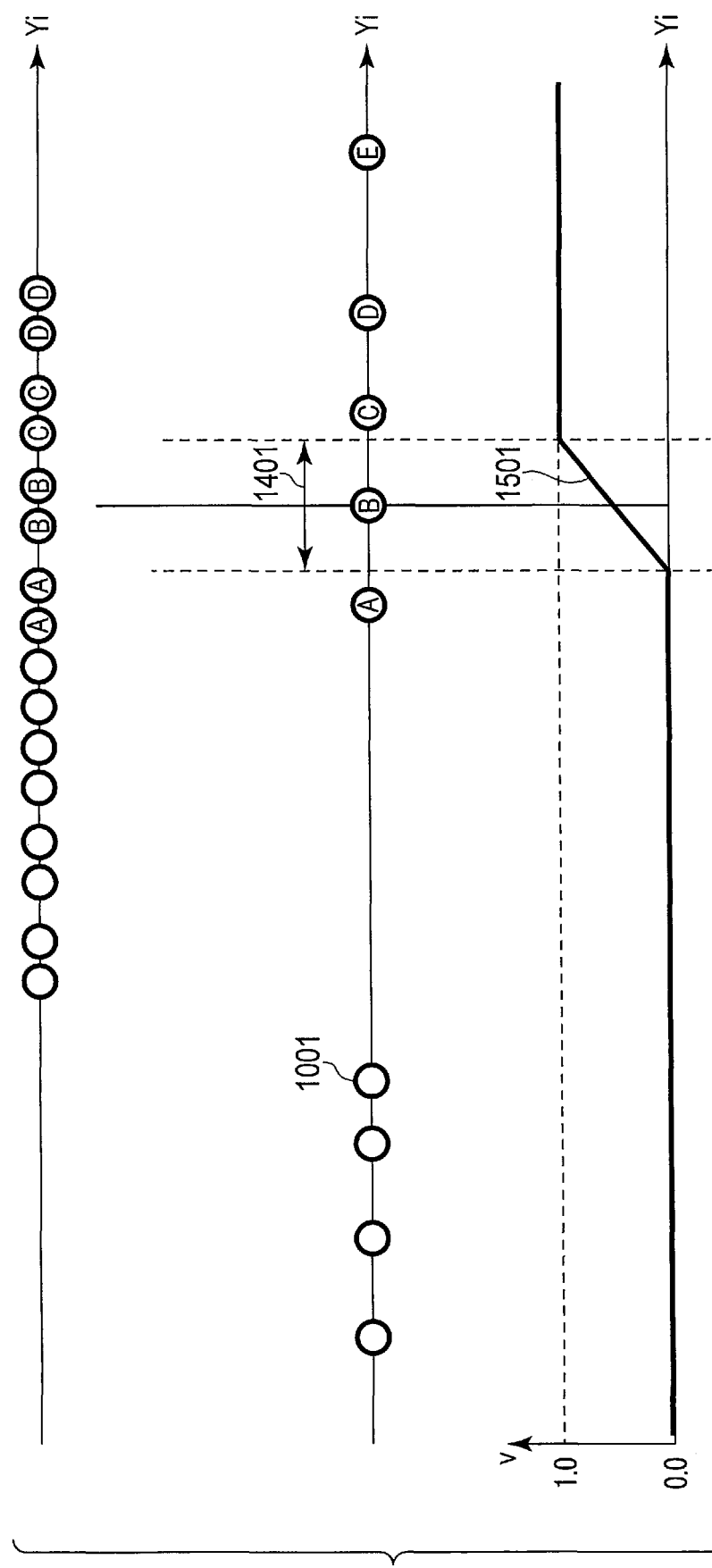
FIG. 15 is a view showing another example of the fourth generation example of state data.

Next, FIG. 15 is similar to FIG. 14, and shows an example of a graph 1501 obtained by linearly interpolating the state data $V\_Y_i$ in the range of "0.0 to 1.0" in the range 1401. Note that not linear interpolation as shown in FIG. 15 but an arbitrary function may be applied.

In this way, the individual state data $v_{d\_}Y_i$ of a product can be set in consideration of uncertainty derived from the quantization error included in the individual data $Y_i$, and cause estimation can be performed based on the bias of the state data $V\_Y_i$. It is therefore possible to improve the possibility that overlook or excessive detection caused by the quantization error included in the individual data $Y_i$ can be reduced.

A fifth generation example of state data will be described next with reference to FIGS. 16 and 17.

The generation unit 801 may calculate the individual state data $v_{d\_}Y_i$ of a product based on not the threshold TH but the probability distribution of the individual data $Y_i$.

Figure 16:
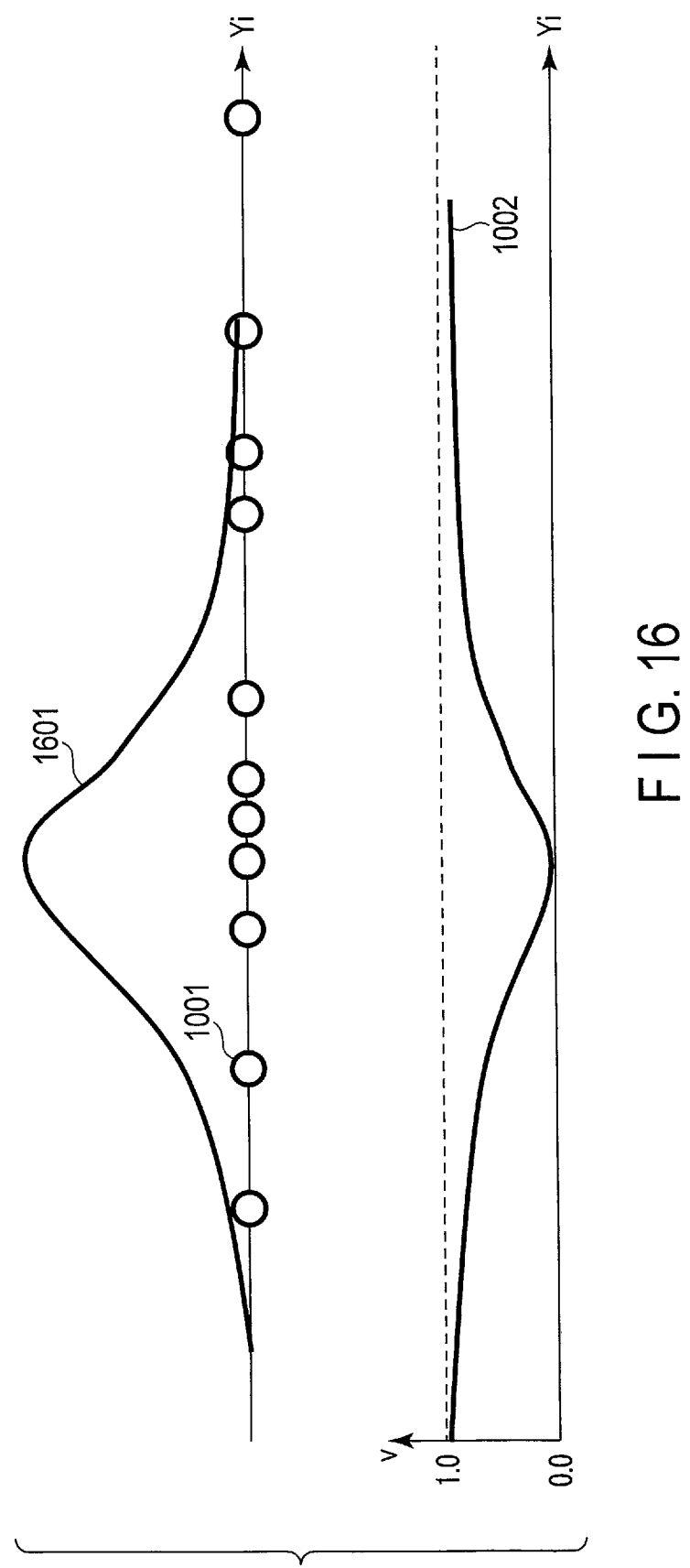
FIG. 16 is a view showing a fifth generation example of state data.

FIG. 16 is similar to FIG. 10, and shows a graph in which the upper side of FIG. 16 shows the value of the individual data $Y_i$ of each product, and the lower shows the value of the individual state data $v_{d\_}Y_i$ of each product corresponding to the individual data $Y_i$.

In the upper side of FIG. 16, a probability distribution $P(Y_i)$ (to be also referred to as a probability distribution 1601 hereinafter) is a probability distribution of the values of the individual data $Y_i$ that a normal product can take. The probability distribution 1601 can be decided from, for example, the distribution of normal products. That is, a lot of individual data $Y_i$ of normal products are distributed in a range near the peak of the probability distribution 1601.

The probability distribution 1601 may be decided based on a product group determined in advance as normal by, for example, human judgement, or may be decided by regarding products manufactured during a given period as a normal product group. Also, as for determination concerning a product group manufactured in, for example, a specific day, for example, the probability distribution 1601 may be decided from the product group manufactured in the day before the specific day. In this case, anomaly detection can be performed on a daily basis in daily product manufacturing. The detection may be done not on a daily basis but by the hour, and many product groups (in, for example, one latest week) may be used by deciding the probability distribution 1601. Note that if the detection is performed, for example, on a daily basis, and the product group of the previous day have many anomalies (for example, if the total sum of anomaly state data is large), the distribution of the previous day may not be regarded as normal, and the probability distribution may be obtained from the day before. That is, the probability distribution may be obtained from the day when a product group for which the total sum of anomaly state data is equal to or less than a threshold.

Note that in the example shown in FIG. 16, the probability distribution 1601 is assumed to be a parametric distribution such as a normal distribution, but a nonparametric distribution may be applied in the framework of density estimation such as a histogram or Parzen estimation.

The generation unit 801 calculates, for example, the value of "$1-P(Y_i)$" as the individual state data $v_{d\_}Y_i$. The present invention is not limited to this, and the individual state data $v_{d\_}Y_i$ can be decided based on the probability distribution 1601.

Figure 17:
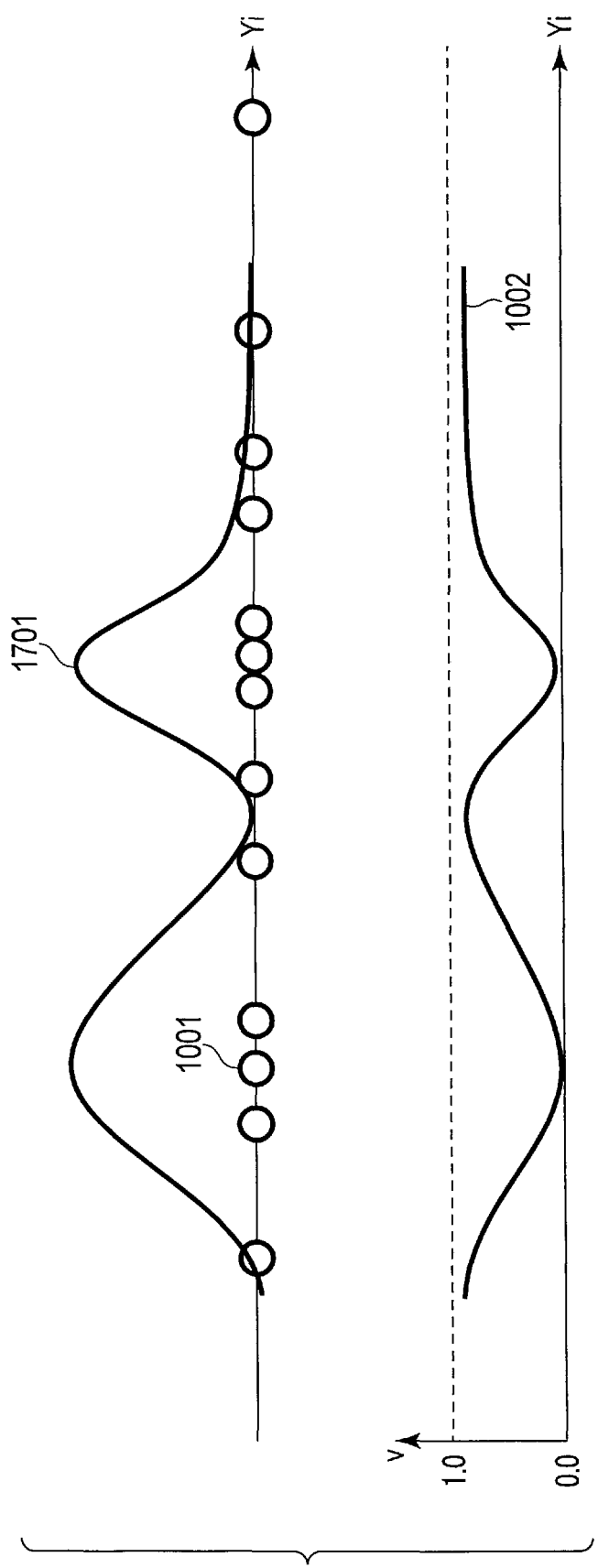
FIG. 17 is a view showing another example of the fifth generation example of state data.

FIG. 17 shows a case in which a multipeak probability distribution 1701 is formed. If the range of normal individual data Y is divided in a plurality of ranges in the manufacturing process, the value of "$1-P(Y_i)$" is calculated as the individual state data $v_{d\_}Y_i$, thereby suitably setting the individual state data $v_{d\_}Y_i$.

Note that the generation unit 801 may calculate the state determination value of products corresponding to the number D of product data, and calculates and outputs one or more state determination value based on $\{v_d \in V : d=1, \ldots, D\}$. The state determination value is a statistic value such as the total sum, the average, the maximum value, or the minimum value of $\{v_d \in V : d=1, \ldots, D\}$, and an example is the total sum of the individual state data $v_d$ in FIG. 6 or FIG. 7 described above. For example, if the state of a product is anomalous, the total sum of $\{v_d \in V : d=1, \ldots, D\}$ is the number of weighted anomalies in the D products. If the state determination value is large, it means that many products of high anomaly probability are generated.

According to the above-described second embodiment, state data is generated from the individual data of a product, thereby calculating appropriate state data considering the situation of the manufacturing process. For example, when a measurement error, a quantization error, a probability distribution of the individual data of products, or the like is taken into consideration, an index value calculated in the subsequent stage becomes a highly accurate value, and overlook or excessive detection can be reduced.

Also, when a state determination value statistically representing the state of a product is output in addition to the state data and the index value, for example, a cause estimation result concerning data with a large state determination value can preferentially be presented to the user.

Third Embodiment

The third embodiment is different from the above-described embodiments in that a generation unit 801 infers state data using a function trained by, for example, a machine learning method.

The generation unit 801 according to the third embodiment receives individual data and generates state data using a function for outputting state data. The function to be used by the generation unit 801 is assumed to be, for example, a trained model trained by machine learning. The trained model may use a function based on, for example, a logistic regression model, a multilayer perceptron, a neural network, a support vector machine, a random forest, or the like. The logistic regression model is a regression model that uses a certain variable as an input. In this embodiment, the input variable is individual data or individual data and other data. As the output of the logistic regression model, a log it value of "0.0 to 1.0" is output.

As a machine learning method of a model, for example, individual data is used as input data, a value "0.0" is given to a normal product, a value "1.0" is given to an anomalous product, and a model is trained using training data combined with supervised data. Note that as the supervised data, a value between "0.0 and 1.0" may be given. For example, if it is difficult to judge whether a product is normal or anomalous, an intermediate value such as "0.5" may be given. When training is performed in this way, a function is trained such that, for an anomalous product included in training data, a value close to "1.0" is output as state data if individual data input as an inference target has a value close to a value trained as anomaly. Note that using outputs from a plurality of trained models, state data obtained by an ensemble may be output.

If the training data sufficiently exists, an intermediate value (for example, 0.5) is expected to be output for intermediate input data between normal and anomaly. Note that semi-supervised learning or weak-supervised learning in which supervised data is prepared for some data may be used. In addition, a trained model may be generated by so-called ensemble learning for training another model using the average or majority result of the results from a plurality of models.

Also, state data may be generated using a method such as the nearest neighbor algorithm using the distance between individual data and data included in training data. For example, if the state of a product is determined as anomaly, a number of individual data are prepared, and if new input data is given, data having the highest similarity is searched from the prepared individual data. As the similarity, simply, the distance between individual data is used. For example, in the framework of the N-nearest neighbor algorithm, for new input data, N neighbor data are acquired from data prepared in advance. Assume that in the data prepared in advance, state data of "0.0" is given as supervised data to a normal product, and state data of "1.0" is given as supervised data to an anomalous product. State data for new input data can be calculated by averaging supervised data (state data) given to N neighbor data. Note that the state data may be decided by a weighted average using the distance to the N neighbor data as a weight.

Since it may be difficult to prepare a lot of training data, the function of the generation unit 801 may be designed by unsupervised learning. For example, a case in which it is determined whether the state of a product is normal or anomalous is assumed. If it can be assumed that a normal product and an anomalous product have different tendencies in individual data, the normal product and the anomalous product are separated in the data space of individual data using, for example, clustering. For example, when the number of anomalous products is assumed to be smaller than the number of normal products, products in unknown states can be classified into normal and anomaly by cluster classification. If there are two or more clusters, and the products are assumed to be classified into a normal cluster and a plurality of anomalous clusters, the products can be classified into a normal state and plurality of anomaly states (different anomaly modes). At this time, state data is calculated based on which anomalous cluster a product has been classified into, thereby performing analysis in each anomaly mode. For new input data, calculation is performed based on state data calculated from the individual data of a representative point in accordance with, for example, the distance to the representative point (centroid or the like) of each cluster, thereby setting the state data of the new input data. In this way, the method of generating state data from individual data is decided by data driven processing, and cause estimation can be performed based on the bias.

Note that the above-described individual data is assumed to be data based on the measurement result of the size, weight, or the like of a product, but may be multi-dimensional data with one or more dimensions, like image data or time-series data. As an image, for example, line sensor data, visible image data, ultrasonic image data, or the like, which aims at inspecting the shape and outer appearance of a product, can be used. As the time-series data, for example, time-series data of values obtained by measuring a temperature change or a change of an electrical value in a product, acoustic data in anomaly sound inspection, or the like can be used.

If individual data is image data, a model obtained by machine learning based on a convolutional neural network (CNN) may be used as the function to be used by the generation unit 801. If individual data is time-series data, a model obtained by machine learning based on a recursive neural network (RNN) may be used as the function to be used by the generation unit 801. Note that in addition to the CNN and the RNN, any existing model may be used if it handles image data or time-series data.

According to the above-described third embodiment, for example, in image data aiming at outer appearance inspection, a subjective inspection item such as the magnitude of dirt is sometimes included, and it may be difficult to decisively discriminate normal and anomalous products. In this case as well, when state data is inferred from individual data using a trained model that has trained to receive individual data and output state data, state data considering uncertainty included in the individual data that is image data or time-series data can be generated, and cause estimation can be performed based on the bias of the state data.

Fourth Embodiment

In the fourth embodiment, a value such as state data or an index value calculated by the data analysis apparatus according to the above-described embodiments is visualized and displayed on a display or the like.

A data analysis system 1 according to the fourth embodiment will be described with reference to FIG. 18.

The data analysis system 1 according to the fourth embodiment includes a data analysis apparatus 10, a data storage apparatus 20, and a display apparatus 30. The data analysis apparatus 10 according to the fourth embodiment includes a data acquisition unit 101, a calculation unit 102, and a display control unit 1801. Note that the data analysis apparatus 10 according to the fourth embodiment may further include a generation unit 801

The display control unit 1801 acquires an index value from the calculation unit 102 and acquires manufacturing data, state data, and a state determination value, as needed, from the data acquisition unit 101. If the generation unit 801 is included in the data analysis apparatus 10, the display control unit 1801 acquires state data (and a state determination value) from the generation unit 801. The display control unit 1801 generates visualized data using the manufacturing data, the state data, the index value, and other data and displays the visualized data on the external display apparatus 30 or the like. The display control unit 1801 may output the visualized data as an image or a graphic, or may output the visualized data in a data format displayable by the display apparatus 30 or in a format such as html (Hypertext Markup Language), xml (eXtensible Markup Language), or JSON (JavaScript® Object Notation).

The display apparatus 30 is assumed to be a device such as a display or a projector, and a device that allows the user to visually recognize data via the display apparatus 30 suffices. Note that the display apparatus 30 may include the data analysis apparatus 10.

An example of display of visualized data will be described next with reference to FIG. 19.

As an example of display of visualized data on the display apparatus 30, a first display region and a second display region are displayed on an interface screen.

In the first display region, an inspection item and a determination value are displayed in correspondence with each state data. Taking the second embodiment as an example, since state data $V\_Y_i$ is generated for individual data $Y_i$ concerning N inspection items, N state data $V\_Y_i$ and a corresponding state determination value are displayed. As the state determination value, for example, the total sum of individual state data $v_d$ calculated for each of D products as inspection targets, a value obtained by dividing the total sum by the number D of products (if the state is anomalous, the value represents an anomaly ratio), or the like is used.

Information displayed in a first display region 1901 changes depending on the magnitude of the state determination value. For example, in the first display region 1901 in a case in which the state determination value is equal to or larger than a first threshold, information concerning the individual data $Y_i$, the state determination value, a first analysis result 1902 concerning the individual data $Y_i$, and second display regions 1911, 1913, and 1914 are displayed. Note that information concerning state data $V\_Y_i$ may be displayed together with the state determination value or in place of the state determination value.

Figure 19:
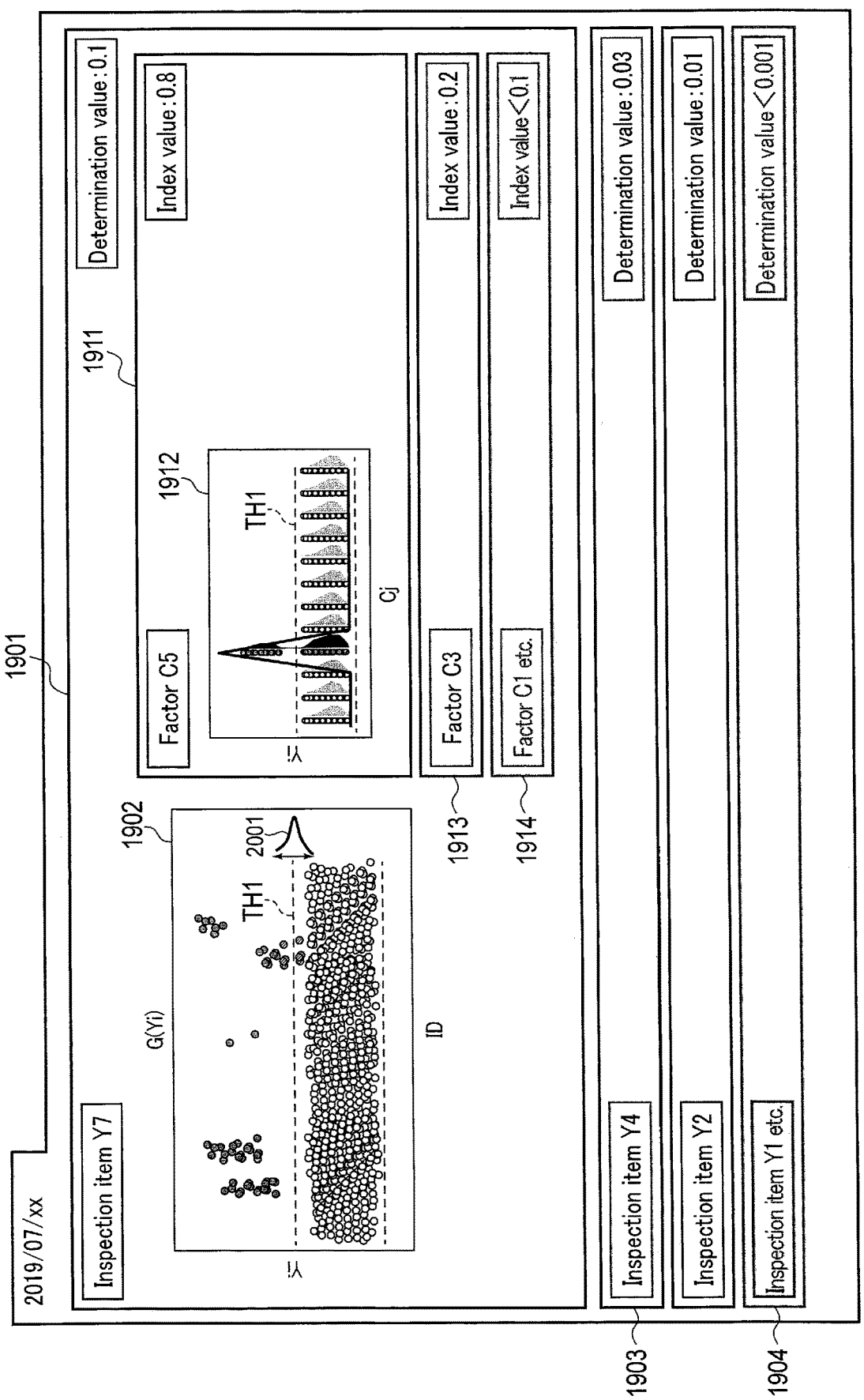
FIG. 19 is a view showing an example of display of visualized data according to the fourth embodiment.

Note that in the example shown in FIG. 19, information ("inspection item Y7") concerning the individual data $Y_i$ is displayed on the upper left side of the first display region 1901, and the state determination value ("determination value: 0.1") is displayed on the upper right side of the first display region 1901. Note that the present invention is not limited to this, and the information can be displayed at any position in the first display region 1901, and can be displayed in any mode if the relationship between the individual data $Y_i$ and the state determination value can be grasped.

In addition, the first display region 1901 itself or characters and graphs in the first display region 1901 may be highlighted. For example, the first display region 1901 may be surrounded by a noticeable color, information concerning individual data may be displayed in bold characters, and an emphasis mark representing a warning or caution may be added.

Next, in a first display region 1903 in a case in which the state determination value is smaller than the first threshold, information concerning the individual data $Y_i$ and a state determination value are displayed, and display of the first analysis result 1902 is omitted.

Also, in a first display region 1904 in a case in which the state determination value is smaller than a second threshold smaller than the first threshold, only one piece of information concerning the individual data $Y_i$ having the state determination value smaller than the second threshold may be displayed as a representative, or a message representing that the state determination value is smaller than the second threshold may be displayed or not. The first display region 1904 may be displayed such that it is unnoticeable as compared to the first display region 1901. For example, the first display region 1904 may be displayed in a light color such as gray or using a broken line or the like.

The display structure of the second display regions 1911, 1913, and 1914 is the same as the display structure of the above-described first display regions 1901, 1903, and 1904. For example, in the second display region 1911, a manufacturing condition $C_j$, an index value $F(V\_Y_i, C_j)$ concerning the individual data $Y_i$, and a second analysis result 1912 that is a cause estimation result based on the index value $F(V\_Y_i, C_j)$ are displayed. In the example shown in FIG. 19, information ("factor C5") concerning the manufacturing condition $C_j$ for which the index value $F(V\_Y_i, C_j)$ is equal to or larger than a third threshold is displayed on the upper left side of the second display region 1911, and the index value $F(V\_Y_i, C_j)$ ("index value: 0.8") is displayed on the upper right side of the second display region 1911. Note that the present invention is not limited to this, and the information can be displayed at any position in the first display region 1901, and can be displayed in any mode. In the second display region 1913 in a case in which the index value $F(V\_Y_i, C_j)$ is smaller than the third threshold, only a manufacturing condition and an index value are displayed, and the second analysis result 1912 is not displayed. In the second display region 1914 in a case in which the index value $F(V\_Y_i, C_j)$ is smaller than a fourth threshold smaller than the third threshold, only one piece of information concerning the manufacturing condition $C_j$ may be displayed as a representative, or a message representing that the manufacturing condition $C_j$ is smaller than the fourth threshold may be displayed. Note that the set of the first threshold and the second threshed and the set of the third threshold and the fourth threshold may be sets of the same values or different values.

FIG. 19 shows an example in which the second display region 1911 is displayed such that it is included in the first display region 1901. However, the first display region 1901 and the second display region 1911 may be displayed independently. In addition, either the first analysis result 1902 or the second analysis result 1912 may be displayed preferentially. For example, if the state determination value is equal to or smaller than the second threshed, it is not displayed as the first display region. However, if an index value is calculated, and the index value is equal to or larger than a threshold, a display mode similar to the first display region 1901 may be used. The first analysis result 1902 and the second analysis result 1912 may be expressed not in a plot diagram but in another display mode such as a table format.

An example of the first analysis result 1902 displayed in the first display region 1901 will be described next with reference to FIGS. 20 and 21.

Figure 20:
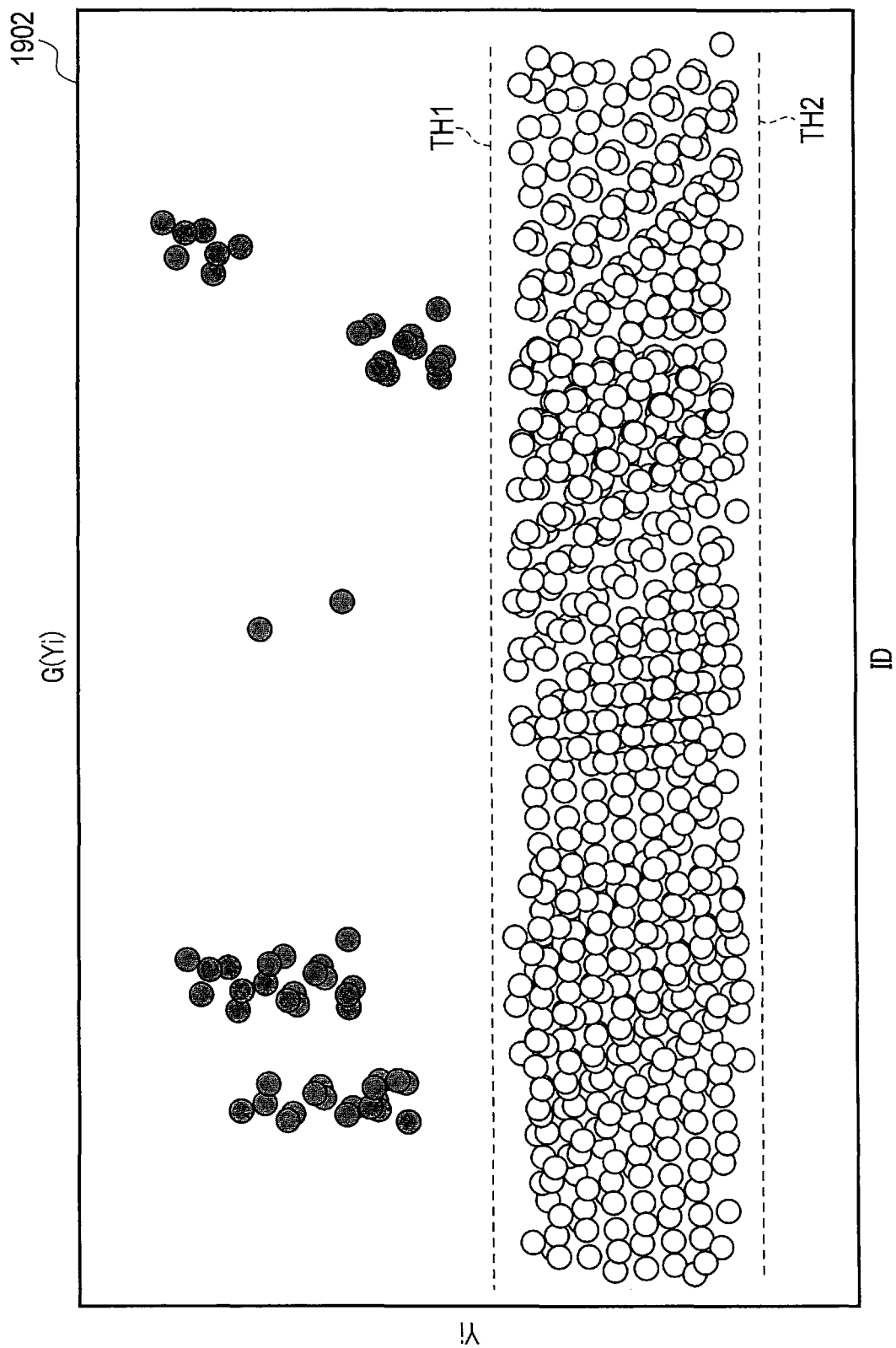
FIG. 20 is a view showing an example of a first analysis result displayed in a first display region.

As shown in FIG. 20, a scatter diagram of the individual data $Y_i$ is displayed as the first analysis result 1902. The vertical axis represents the value of individual data, and the horizontal axis represents an identification number (expressed as ID in FIG. 20). The identification numbers are arranged time-serially in the ascending order of the identification number. Each plot represents one product.

As shown in FIG. 20, the plot of individual data $Y_i$ whose value is larger than a threshold TH1, that is, which is determined to be anomalous is expressed in a different color. This can facilitate intuitively grasping not only the distribution of the individual data $Y_i$ but also the number of anomaly values and the distance between individual data determined as anomaly and the threshold, and can visually present the degree of anomaly to the user.

Figure 21:
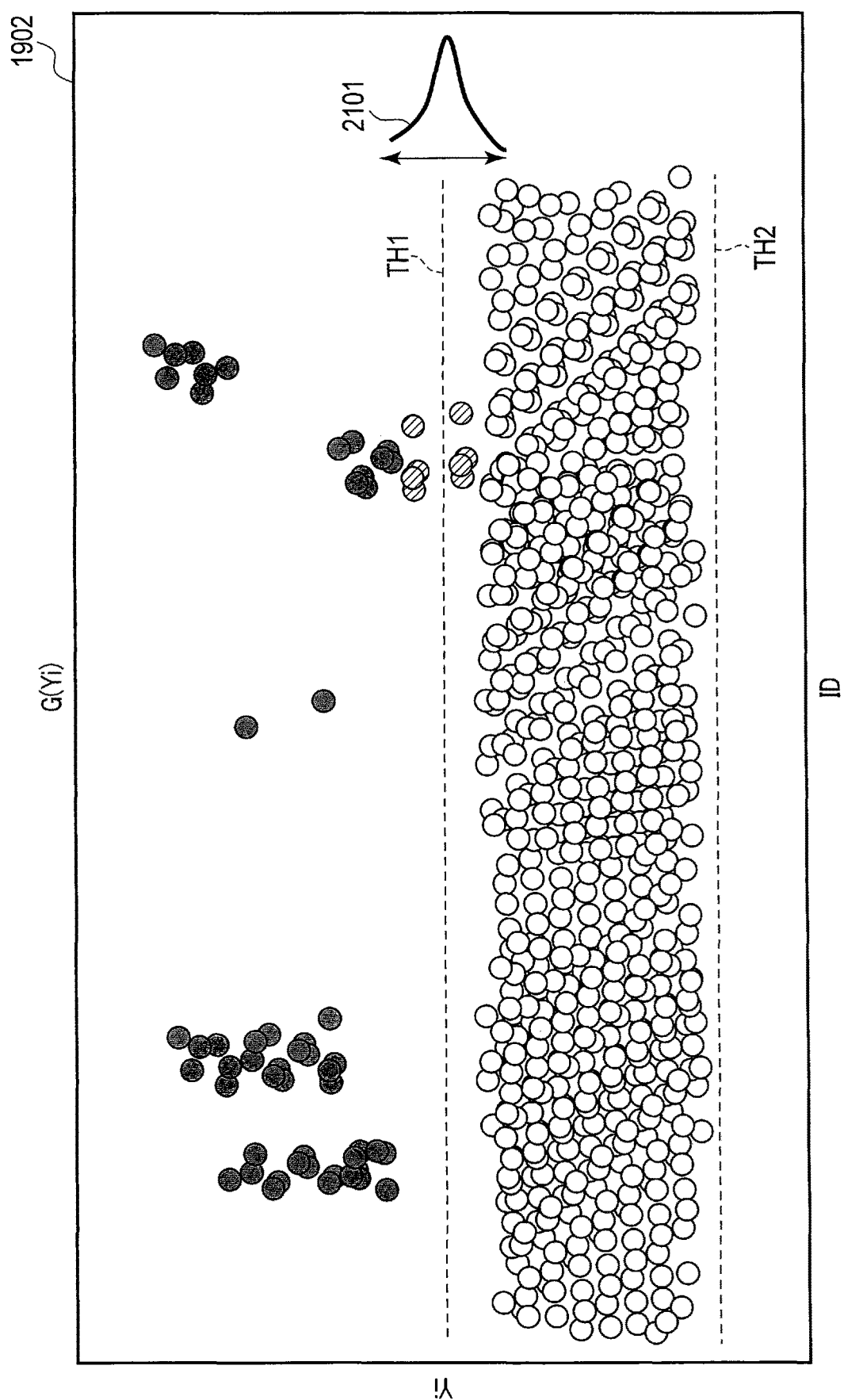
FIG. 21 is a view showing another example of the first analysis result displayed in the first display region.

Also, as shown in FIG. 21, a graph 2101 showing the calculation criterion of state data may be displayed. In the example shown in FIG. 21, the range 1201 of measurement variations shown in FIG. 12 is displayed as the graph 2101.

In addition, when the identification numbers are plotted in order along the horizontal axis of the scatter diagram, a product in which anomaly has occurred can be specified. Note that time information of manufacturing of a product may be plotted along the horizontal axis. This can specify a time zone in which anomaly has occurred. Note that the first analysis result 1902 may be displayed not only as a scatter diagram but also using another expression method such as a histogram, a box plot, or a violin plot.

Display is not limited to diagrams, and numerical data may directly be displayed. The display control unit 1801 need only control to display the number of products included in analysis, the number of products determined as anomaly, and other basic numerical data as analysis results. This allows the user to make examinations about anomaly, including the numerical data.

Note that in the embodiment, taking the second embodiment as an example, an example in which a diagram concerning the individual data $Y_i$ is displayed as an analysis result has been described. A diagram (a scatter diagram, a histogram, a box plot, or the like in which V is plotted along the vertical axis or horizontal axis) concerning state data V or Vi according to the first embodiment may be displayed.

Note that if the calculation unit 102 generates a plurality of types of analysis results, the display control unit 1801 may display the plurality of types of analysis results. A plurality of index values are represented by $G\_r(Y_i)$ {r:1, ..., Q}, where r indicates the type of an analysis method. For example, for a state determination value displayed in the first display region 1901, the total sum of the individual state data $v_{d\_}Y_i$ may be obtained as one analysis result, and a value obtained by dividing the individual state data $v_{d\_}Y_i$ by the number of products may be displayed as another analysis result. Also, the difference or ratio between a previous state determination value and a current state determination value may be displayed as a new analysis result. When a plurality of analysis results are generated, it is possible to examine data from various aspects and support user's judgement.

An example of the second analysis result 1912 displayed in the second display region 1911 will be described next with reference to FIGS. 22 and 23.

Analysis information $G(Y_i, C_j)$ that is the second analysis result 1912 presents more detailed information concerning the index value $F(V\_Y_i, C_j)$ to the user. FIG. 22 is a scatter diagram in which the vertical axis represents the value of the individual data $Y_i$, and the horizontal axis represents the manufacturing condition $C_j$, for example, the type of a manufacturing apparatus. In FIG. 22, each plot represents one individual product. FIG. 22 assumes a case in which the bias of products determined as anomaly to a specific manufacturing condition is used as the index value $F(V\_Y_i, C_j)$.

Hence, the threshold TH1 used for determination and a line graph 2201 representing the bias rate to a specific manufacturing condition are shown. The distribution of a manufacturing condition with a large bias may be highlighted by changing the color. This can facilitate intuitively grasping the distribution of the individual data $Y_i$ and the bias for each manufacturing condition $C_i$, and can visually present the degree of anomaly to the user.

Figure 22:
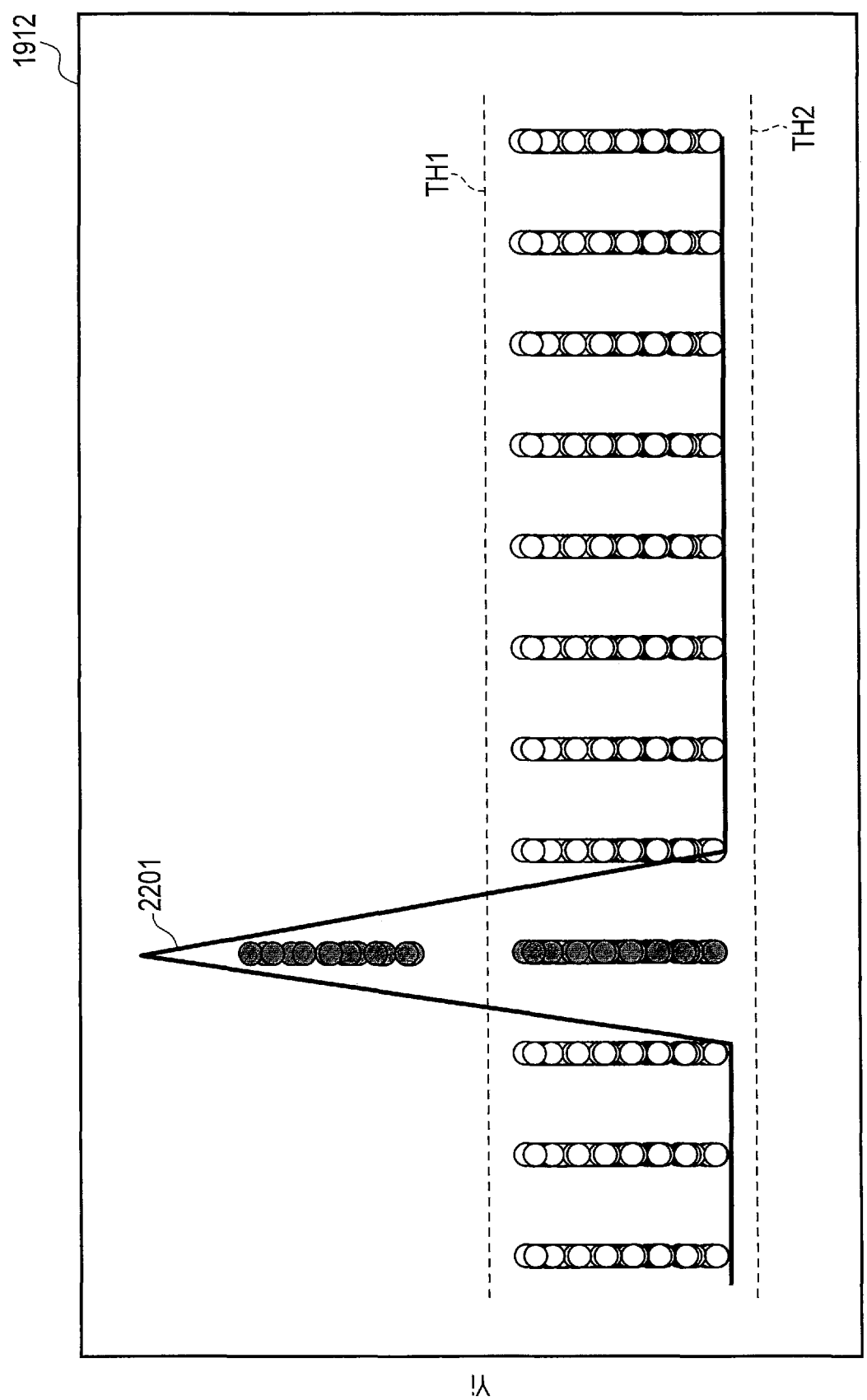
FIG. 22 is a view showing an example of a second analysis result displayed in a second display region.

FIG. 23 shows an example in which a histogram 2301 is displayed in addition to the scatter diagram of FIG. 22. Since the frequency of plots in each manufacturing condition $C_j$ is displayed as the histogram 2301, the state can easily be grasped. The second analysis result 1912 may be displayed in a diagram other than the scatter diagram, like the first analysis result 1902.

In the example shown in FIGS. 22 and 23, the description has been made assuming that the manufacturing condition $C_j$ is categorical data. However, the manufacturing condition $C_j$ may be numerical data. In this case, the scatter diagram may be generated as analysis information. Also, the graph 2101 showing the calculation criterion of state data may further be displayed, as in FIG. 21. As information concerning the index value, a regression line, a correlation coefficient, or the like is displayed. In the second analysis result, a plurality of types of analysis results may be generated, like the first analysis result. A plurality of index values are represented by $G_s(Y_i, C_i)$ {a:1, ..., S}, where s indicates the type of an analysis method. Note that if the calculation unit 102 generates a plurality of types of analysis results, the display control unit 1801 may display the plurality of types of analysis results, as in the first display region. As the index value to be displayed in the second display region 1911, a value calculated for each type of test shown in the above-described first embodiment may be used as a different analysis result. The difference or ratio between a previous index value and a current index value may be displayed as a new analysis result. When a plurality of analysis results are thus generated, it is possible to support the user.

According to the above-described fourth embodiment, manufacturing data concerning the state of a product and manufacturing data concerning a manufacturing condition are displayed by deciding the information amount and the priority of the analysis result based on the magnitude of a state determination value or an index value. This allows the user to preferentially monitor manufacturing data predicted to have a high correlation with anomaly, and a confirmation burden on the user and overlook can be expected to decrease.

Figure 24:
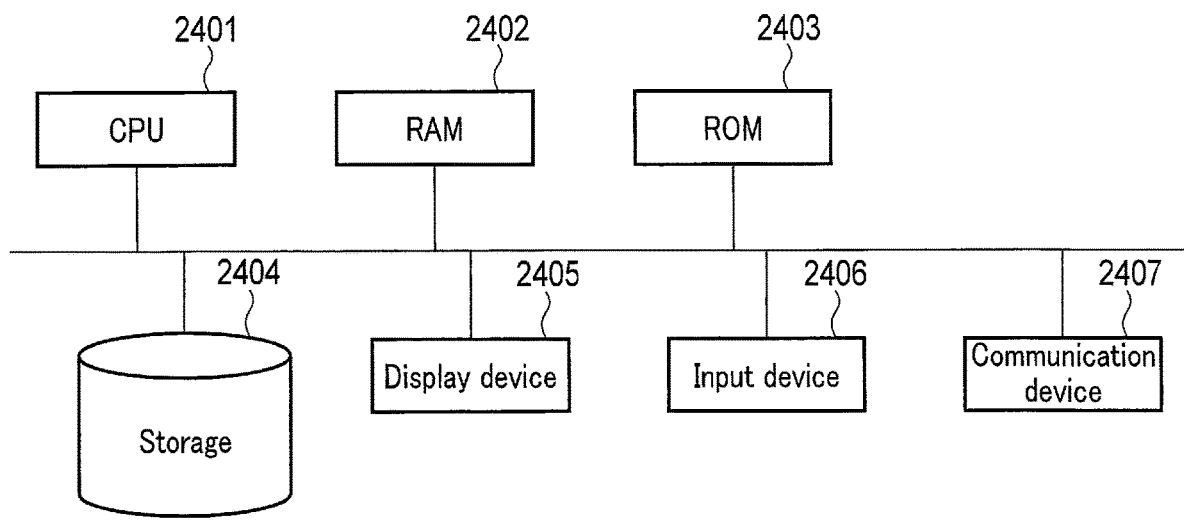
FIG. 24 is a view showing an example of the hardware configuration of the data analysis apparatus.

FIG. 24 shows an example of the hardware configuration of the data analysis apparatus according to the above-described embodiment.

The data analysis apparatus includes a CPU (Central Processing Unit) 2401, a RAM (Random Access Memory) 2402, a ROM (Read Only Memory) 2403, a storage 2404, a display device 2405, an input device 2406, and a communication device 2407, and these are connected by a bus. Note that the display device 2405 need not always be included as the hardware configuration of the data analysis apparatus.

The CPU 2401 is a processor configured to execute arithmetic processing, control processing, and the like in accordance with a program. Using a predetermined area of the RAM 2402 as a work area, the CPU 2401 executes various kinds of processing in cooperation with a program stored in the ROM 2403 or the storage 2404. For example, The CPU 2401 executes functions relating to each unit of the data analysis apparatus or the data analysis system according to embodiments described above.

The RAM 2402 is a memory such as an SDRAM (Synchronous Dynamic Random Access Memory). The RAM 2402 functions as the work area of the CPU 2401. The ROM 2403 is a memory configured to non-rewritably store programs and various kinds of information.

The storage 2404 is a device configured to write/read data to/from a magnetic recording medium such as an HDD (Hard Disc Drive), a storage medium by a semiconductor such as a flash memory, a magnetically writable storage medium such as an HDD, or an optically writable storage medium. The storage 2404 writes/reads data to/from the storage medium under the control of the CPU 2401.

The display device 2405 is a display device such as an LCD (Liquid Crystal Display). The display device 2405 displays various kinds of information based on a display signal from the CPU 2401.

The input device 2406 is an input device such as a mouse or a keyboard. The input device 2406 accepts information operated and input by the user as an instruction signal, and outputs the instruction signal to the CPU 2401.

The communication device 2407 communicates with an external device via a network under the control of the CPU 2401.

An instruction shown in the processing procedure described in the above-described embodiment can be executed based on a program that is software. When a general-purpose computer system stores the program in advance and loads the program, the same effects as the effects of the control operations of the above-described data analysis apparatus and the data analysis system can be obtained. An instruction described in the above-described embodiment is recorded, as a program that can be executed by a computer, in a magnetic disc (a flexible disc, a hard disc, or the like), an optical disc (a CD-ROM, a CD-R, a CD-RW, a DVD-ROM, a DVD±R, a DVD±RW, a Blu-ray® Disc, or the like), a semiconductor memory, or a recording medium similar to these. Any storage format can be used if the recording medium can be read by a computer or an embedded system. The computer loads the program from the recording medium and causes, based on the program, the CPU to execute an instruction described in the program, thereby implementing an operation similar to the control of the data analysis apparatus and the data analysis system according to the above-described embodiment. When acquiring or loading the program, the computer may acquire or load the program via the network.

In addition, MW (middleware) such as an OS (operating system), data management software, or a network operating on the computer based on an instruction of the program installed from the recording medium to the computer or the embedded system may execute part of processing for implementing the embodiment.

Furthermore, the recording medium according to the embodiment includes not only a medium independent of the computer or the embedded system but also a recording medium that downloads the program transmitted by a LAN or the Internet and stores or temporarily stores it.

The recording medium is not limited to one recording medium. The recording medium according to the embodiment also includes a case in which the processing according to the embodiment is executed from a plurality of media, and the recording medium can have any configuration.

Note that the computer or the embedded system according to the embodiment is configured to execute each processing according to the embodiment based on the program stored in the recording medium, and can be a single apparatus such as a personal computer or a microcomputer, or a system formed by connecting a plurality of apparatuses via a network.

Also, the computer according to the embodiment is not limited to a personal computer and includes an arithmetic processing device included in an information processing apparatus, a microcomputer, and the like. Apparatuses and devices, which can implement the functions according to the embodiment by a program, are collectively called a computer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data analysis apparatus comprising a processor configured to:
    acquire from a data storage apparatus, for a plurality of products as analysis targets, manufacturing data including at least one manufacturing condition for each product of the products;
    calculate, based on a bias of first state data representing a degree that the product is in a specific state in at least one item that can be taken concerning a first manufacturing condition extracted from the manufacturing data, an index value representing a degree that a cause of the specific state of the product is the first manufacturing condition;
    display, based on the calculated index value, information concerning the first state data in a first display region of a graphical user interface (GUI) of a display apparatus, and information concerning the index value in a second display region of the GUI for each manufacturing condition that causes of anomaly or normal of the product, wherein the first display region is different from the second display region;
    when a state determination value calculated from the first state data is not less than a first threshold, display in the GUI on the display apparatus, an analysis result concerning the first state data of the product preferentially to an analysis result concerning second state data that is different from the first state data; and
    when the calculated index value relating a first manufacturing condition is not less than a second threshold, display, in the GUI on the display apparatus, an index value of the product preferentially to an index value calculated relating a second manufacturing condition different from the first manufacturing condition and the analysis result, wherein the first threshold is different from the second threshold.

2. The apparatus according to claim 1, wherein the processor acquires individual data representing a measurement value specific to the product, and generates state data from the individual data.

3. The apparatus according to claim 2, wherein the processor generates the state data according to an error of the individual data.

4. The apparatus according to claim 2, wherein the processor generates the state data based on one of a measurement error and a quantization error of the individual data.

5. The apparatus according to claim 2, wherein the processor infers the state data from the individual data as analysis target using a trained model trained to receive the individual data and output the state data.

6. The apparatus according to claim 2, wherein the individual data is one of multi-dimensional data including image data and time-series data.

7. The apparatus according to claim 1, wherein the processor calculates the index value representing the bias of the first state data for each item.

8. The apparatus according to claim 1, wherein the processor calculates the index value using a statistical test for the item and the state data.

9. The apparatus according to claim 1, wherein the specific state is a specific mode concerning the product.

10. The apparatus according to claim 1, wherein the specific state is an anomaly state.

11. The apparatus according to claim 1, wherein the specific state represents belonging to a specific cluster when a cluster classification is performed to an unknown state.

12. The apparatus according to claim 1, wherein the processor controls to display information concerning the first state data in a first display region and display information concerning the index value in a second display region for each manufacturing condition.

13. The apparatus according to claim 12, wherein when a state determination value calculated from the first state data concerning first individual data is not less than a threshold, the processor displays information concerning an analysis result concerning the first individual data and the state determination value, and when the state determination value is less than the threshold, the processor displays only information concerning the state determination value of the first individual data.

14. The apparatus according to claim 12, wherein the first state data is data concerning the individual data representing the measurement value specific to the product, and when the index value calculated concerning a first manufacturing condition is not less than a threshold, the processor displays information concerning an analysis result concerning the first manufacturing condition and the index value, and when the index value is less than the threshold, the processor displays only information concerning the index value of the first manufacturing condition.

15. The apparatus according to claim 1, wherein the first state data and the second state data are data concerning the individual data representing the measurement value specific to the product, and the analysis result includes information concerning the individual data.

16. The apparatus according to claim 1, wherein the processor controls, based on the state determination value calculated from the state data, amount of information when displaying the analysis result.

17. A data analysis method comprising:
acquiring, by a processor for a plurality of products as analysis targets, manufacturing data including at least one manufacturing condition for each product of the products;
calculating, by the processor based on a bias of first state data representing a degree that the product is in a specific state in at least one item that can be taken concerning first manufacturing condition extracted from the manufacturing data, an index value representing a degree that a cause of the specific state of the product is the first manufacturing condition;
displaying, based on the calculated index value, information concerning the first state data in a first display region of a graphical user interface (GUI) of a display apparatus, and information concerning the index value in a second display region of the GUI for each manufacturing condition that causes of anomaly or normal of the product, wherein the first display region is different from the second display region;
when a state determination value calculated from the first state data is not less than a first threshold, displaying in the GUI on the display apparatus, an analysis result concerning the first state data of the product preferentially to an analysis result concerning second state data that is different from the first state data; and
when the calculated index value relating a first manufacturing condition is not less than a second threshold, displaying, in the GUI on the display apparatus, an index value of the product preferentially to an index value calculated relating a second manufacturing condition different from the first manufacturing condition and the analysis result, wherein the first threshold is different from the second threshold.

18. A data analysis system comprising:
a data storage apparatus, a data analysis apparatus and a display apparatus, the data storage apparatus configured to store, for a plurality of products as analysis targets, manufacturing data including at least one manufacturing condition for each product of the products, the data analysis apparatus comprising a processor configured to:
acquire the manufacturing data from the data storage apparatus; and
calculate, based on a bias of first state data representing a degree that the product is in a specific state in at least one item that can be taken concerning first manufacturing condition extracted from the manufacturing data, an index value representing a degree that a cause of the specific state of the product is the first manufacturing condition, the display apparatus configured to display, based on the calculated index value, information concerning the first state data in a first display region of a graphical user interface (GUI), and to display information concerning the index value in a second display region of the GUI for each manufacturing condition that causes of anomaly or normal of the product, wherein the first display region is different from the second display region;
when a state determination value calculated from the first state data is not less than a first threshold, displaying in the GUI on the display apparatus, an analysis result concerning the first state data of the product preferentially to an analysis result concerning second state data that is different from the first state data; and
when the calculated index value relating a first manufacturing condition is not less than a second threshold, displaying, in the GUI on the display apparatus, an index value of the product preferentially to an index value calculated relating a second manufacturing condition different from the first manufacturing condition and the analysis result, wherein the first threshold is different from the second threshold.

* * * * *